US012645509B2

(12) United States Patent
Lo et al.

(10) Patent No.: US 12,645,509 B2
(45) Date of Patent: Jun. 2, 2026

(54) METHODS AND SYSTEMS FOR INTEGRATING COMPUTER APPLICATIONS

(71) Applicant: Atlassian Pty Ltd., Sydney (AU)

(72) Inventors: Roger Chi-Ho Lo, Sydney (AU); Kristy Donaldson, Sydney (AU); Aditya Karia, Sydney (AU); Asheer Arslan Ahmad, Sydney (AU); Rachel Lin, Sydney (AU); Andrew Hammond, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 454 days.

(21) Appl. No.: 18/244,179

(22) Filed: Sep. 8, 2023

(65) Prior Publication Data

US 2025/0086030 A1 Mar. 13, 2025

(51) Int. Cl.
*G06F 9/54* (2006.01)
*G06F 3/0482* (2013.01)
*G06F 3/0484* (2022.01)

(52) U.S. Cl.
CPC .............. *G06F 9/54* (2013.01); *G06F 3/0482* (2013.01); *G06F 3/0484* (2013.01)

(58) Field of Classification Search
CPC ......... G06F 9/54; G06F 3/0482; G06F 3/0484
See application file for complete search history.

(56) References Cited

U.S. PATENT DOCUMENTS

| | | | | |
|---|---|---|---|---|
| 6,094,684 A | * | 7/2000 | Pallmann .................. | G06F 9/54 |
| | | | | 709/227 |
| 8,667,410 B2 | * | 3/2014 | Schacht .............. | G06V 30/416 |
| | | | | 715/224 |
| 11,064,047 B1 | * | 7/2021 | Stegall ...................... | G06F 8/61 |
| 11,301,538 B1 | * | 4/2022 | Zanni ...................... | G06F 9/451 |
| 2005/0050210 A1 | * | 3/2005 | Kennedy ........ | G06Q 10/063114 |
| | | | | 709/229 |
| 2006/0168582 A1 | * | 7/2006 | Muller .................. | G06Q 10/10 |
| | | | | 718/100 |
| 2008/0215589 A1 | * | 9/2008 | Elhaik .................. | G06F 16/958 |
| 2010/0077316 A1 | * | 3/2010 | Omansky .............. | G06Q 10/10 |
| | | | | 345/173 |

* cited by examiner

*Primary Examiner* — William L Bashore
*Assistant Examiner* — Gregory A Distefano
(74) *Attorney, Agent, or Firm* — Brownstein Hyatt Farber Schreck, LLP

(57) ABSTRACT

A method for associating a first object of a first computer application with a second object of a second computer application. The method includes installing an auxiliary module of the first computer application in a client of the second computer application; displaying, by the auxiliary module, an interactive element in a user interface generated by the client that displays the second object, the interactive element including a control to associate the second object with the first object; in response to detecting selection of the control, generating and communicating, by the auxiliary module, an association request to the first computer application to cause the first computer application to create a correspondence record associating the first object with the second object; receiving, by the auxiliary module, object data associated with the first object from the first computer application; and displaying the object data associated with the first object in the interactive element.

20 Claims, 13 Drawing Sheets

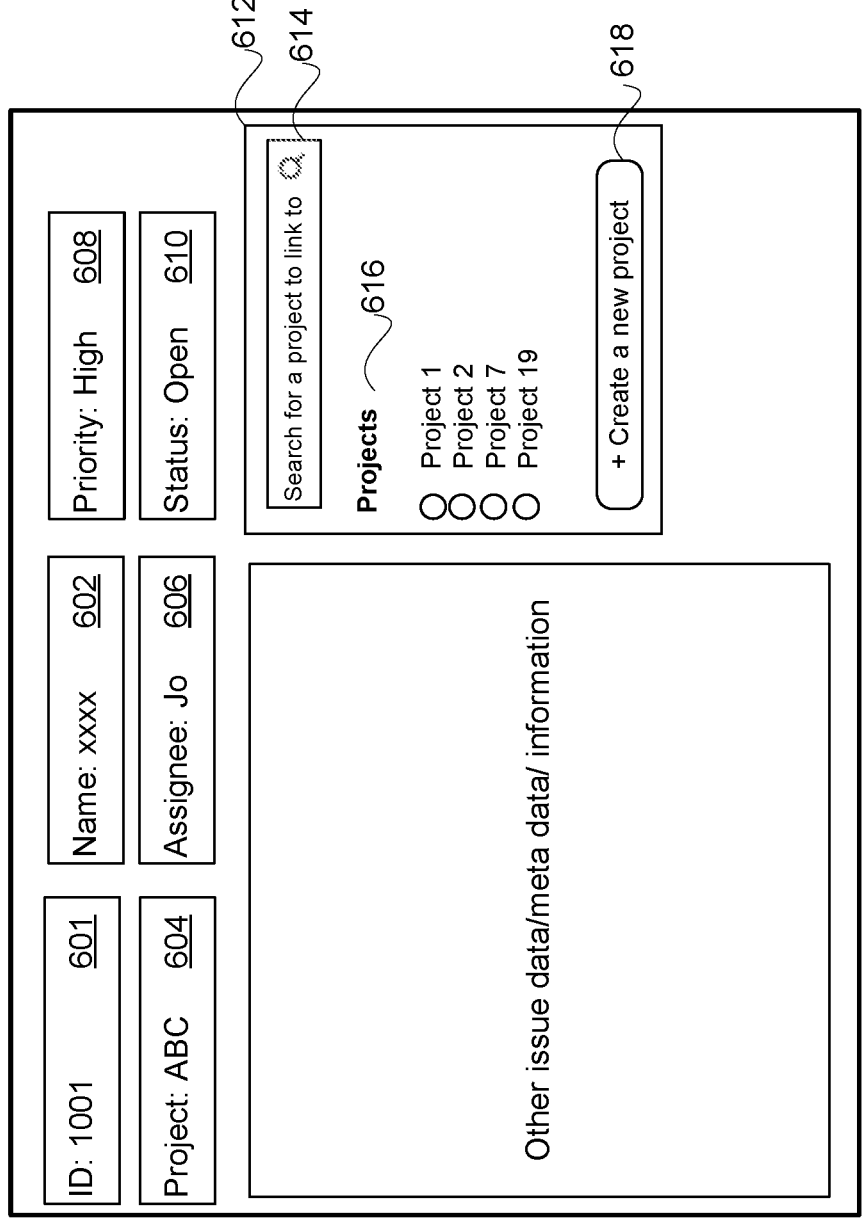
Fig. 6

700

ID: 1001    601

Name: xxxx    602

Priority: High    608

Project: ABC    604

Assignee: Jo    606

Status: Open    610

702

612

706

704

708

Project 1    On Track

About this project

What are we doing?
xxxxxxxxxxxxxxxxxxxxxxxxxxx
xxxxxxxxxxxxxxxxxxxxxx.

Why are we doing it?
xxxxxxxxxxxxxxxxxxxxxxxxxxxxx
xxxxxxxxxxxxxxxxxxxxxxxxxxxxx
xxxxxxxxx How will we measure success?
xxxxxxxxxxxxxxxxxxxxxxxxxxxxx
xxxxxxxxxxxxxxxxxxxxxxxxxxx.

Go to Project    Unlink Project 710    712

Other issue data/meta data/ information

METHODS AND SYSTEMS FOR INTEGRATING COMPUTER APPLICATIONS

TECHNICAL FIELD

Aspects of the present disclosure are directed to computer applications and more particularly to integrating two or more computer applications to allow the applications to share data and provide cross-functionality.

BACKGROUND

Typically computer applications are created to offer specific features to users. For example, one computer application may be developed to provide an online real time chat service whereas another computer application may be developed to deliver another service, such as online collaboration for projects. Over time, many developments may be made in both computer applications as they grow and each computer application may have a rich and complex backend system that supports the corresponding computer application. Traditionally, separate computer applications, which may be developed by different parties or may be operated by different platforms that are generally not compatible, may not be able to share data between the applications in a simple and efficient manner.

Over time, situations may arise where it might be beneficial to automatically share data between the computer applications and to provide cross-product functionality—e.g., it might be beneficial to provide project details from the online collaboration application to a chat that mentions the project in the real time chat application and/or add comments regarding the project in the online collaboration application from a chat in the real time chat application.

However, this may be difficult as the two computer applications are often developed by different parties, independently and without any regard to the possible future integration with other computer applications. Therefore, the process of integrating two existing computer applications often involves solving numerous technical compatibility issues in order for the existing products to function together in a relatively cohesive fashion.

Accordingly, there exists a need for simpler, more efficient mechanism for introducing cross-application functionality and sharing data between computer applications.

SUMMARY

Example embodiments described herein are directed to a computer-implemented method for associating a first object maintained by a first computer application with a second object maintained by a second computer application. The first and second computer applications are independent computer applications. The method includes installing an auxiliary module provided by the first computer application in a second client associated with the second computer application, and displaying, by the auxiliary module, an interactive element in a user interface generated by the second client. The user interface displays the second object and the interactive element includes a control to associate the second object with the first object. The method further includes in response to detecting selection of the control, generating by the auxiliary module, an association request, the association request including an identifier of the first object and an identifier of the second object, and communicating, by the auxiliary module, the association request to the first computer application to cause the first computer application to create a correspondence record in a correspondence table. The correspondence record associates the first object with the second object and includes the identifiers of the first and second objects. The method further includes receiving, by the auxiliary module, object data associated with the first object from the first computer application, and displaying the object data associated with the first object in the interactive element.

Other example embodiments described herein are directed to a computer-implemented method for creating a first object to be maintained by a first computer application using a client of a second computer application. The first and second computer applications are independent computer applications. The method includes installing an auxiliary module provided by the first computer application in the client associated with the second computer application and displaying, by the auxiliary module, an interactive element in a user interface generated by the client associated with the second computer application. The interactive element includes a control to create the first object. The method further includes in response to detecting selection of the control, generating by the auxiliary module, a creation request, the creation request including at least a name of the first object, and communicating, by the auxiliary module, the creation request to the first computer application to cause the first computer application to create the first object. The method further includes receiving, by the auxiliary module, object data associated with the first object from the first computer application, and displaying the object data associated with the first object in the interactive element.

Some example embodiments are directed to a system. The system includes a processor and a non-transitory computer readable medium comprising instructions, which when executed by the processor, cause the system to perform the steps of the methods described above.

Other example embodiments are directed to non-transitory computer readable medium which when executed by a processor causes the processor to perform the methods described above.

BRIEF DESCRIPTION OF THE DRAWINGS

In the drawings:

FIG. 6 is an example issue view user interface.

FIG. 7 is another example issue view user interface.

Figure 1:
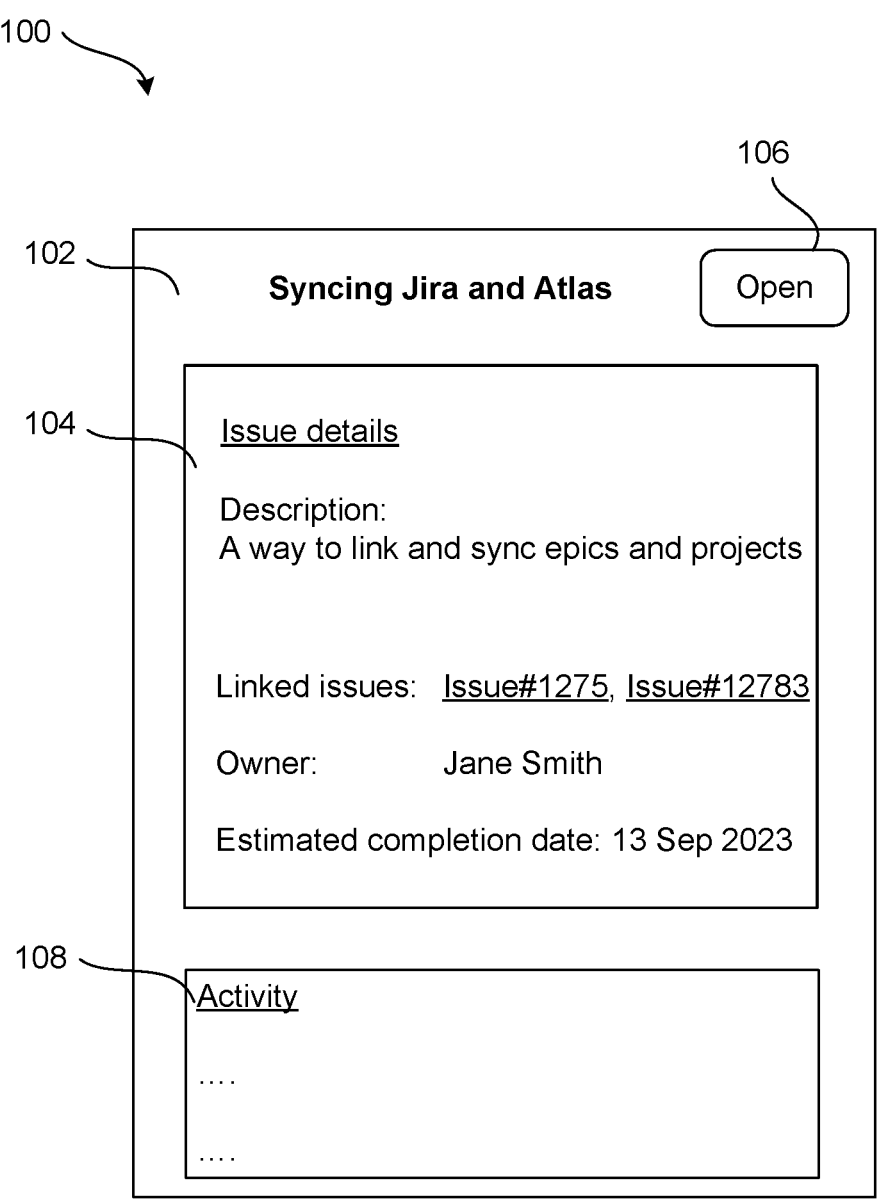
FIG. 1 is an example user interface displayed by an issue tracking system (ITS) for an example issue.

While the description is amenable to various modifications and alternative forms, specific embodiments are shown by way of example in the drawings and are described in detail. It should be understood, however, that the drawings and detailed description are not intended to limit the disclosure to the particular form disclosed. The intention is to cover all modifications, equivalents, and alternatives falling within the scope of the present disclosure as defined by the appended claims.

DETAILED DESCRIPTION

In the following description numerous specific details are set forth in order to provide a thorough understanding of the present disclosure. It will be apparent, however, that the present disclosure may be practiced without these specific details. In some instances, well-known structures and devices are shown in block diagram form in order to avoid unnecessary obscuring.

Typically computer applications are created to offer specific features to users. For example, one computer application may be developed to provide a first set of services (e.g., a chat service) whereas another computer application may be developed to deliver another service, such as online collaboration for projects. Over time, situations may arise where it might be beneficial to automatically share data between the computer applications and to provide cross-product functionality—e.g., it might be beneficial to provide project details from the online collaboration application to a chat that mentions the project in the real time chat application and/or add comments regarding the project in the online collaboration application from a chat in the real time chat application.

However, this may be difficult as the two computer applications are often developed by different parties, independently and without any regard to the possible future integration with other computer applications. Therefore, the process of integrating two existing computer applications often involves solving numerous technical compatibility issues in order for the existing products to function together in a relatively cohesive fashion. Accordingly, there exists a need for simpler, more efficient mechanism for introducing cross-application functionality and sharing data between computer applications.

As discussed above, situations may arise where it might be beneficial to share data between two computer applications and/or provide cross-product functionalities in one or both computer applications. For example, consider the situ-ation where one computer application is an issue tracking system (ITS) and another computer application is a project communication tool (PCT).

Issue tracking systems are systems that manage the creation and tracking of issues or tickets in a variety of contexts. An issue is an item with associated information (e.g., a title and a brief description) and an associated workflow—e.g. a series of states through which the issue transitions over its lifecycle (e.g., pending, assigned, in process, completed).

As one example, an ITS may be deployed for use by a service helpdesk—e.g., an IT service helpdesk in a large organization. A busy service helpdesk may manage thousands, tens of thousands, or even more issues. Each issue may have a different priority, require different actions, be handled by different people, and/or be handled by multiple different people over its lifecycle. An ITS may be used to assist in managing and tracking this process. When a problem is submitted to the helpdesk, an "issue" is created and assigned (at times with a particular priority). As the issue is worked on by various users, the progress of the issue is recorded and tracked by the ITS until, ideally, the issue is resolved and closed.

FIG. 1 illustrates an example user interface (UI) 100 displayed by an example ITS system for a particular issue. In this example, the UI displays a title 102 of the issue (e.g., 'Syncing Jira and Atlas') and issue details 104. The issue details 104, may include a description associated with the issue (e.g., 'A way to link and sync epics and projects'), a list of issues linked to the given issue, a person or team associate with the issue (e.g., Atlas team in this example), activity 108 associated with the issue, a status 106 of the issue (e.g., completed, in-progress, not started, etc.), an estimated completion date, etc.

Generally speaking, the PCT provides status updates of projects and goals. Specifically, the project communication tool allows users to conveniently create and subscribe to (e.g., follow) projects and/or goals. The tool is also configured to automatically prompt project and/or goal owners for project and/or goal updates and deliver digests of project and/or goal updates to subscribers.

Generally speaking, a project is a set of collected project data relating to a project as defined by project fields and a goal is set of collected goal data relating to a goal as defined by goal fields.

Figure 2:
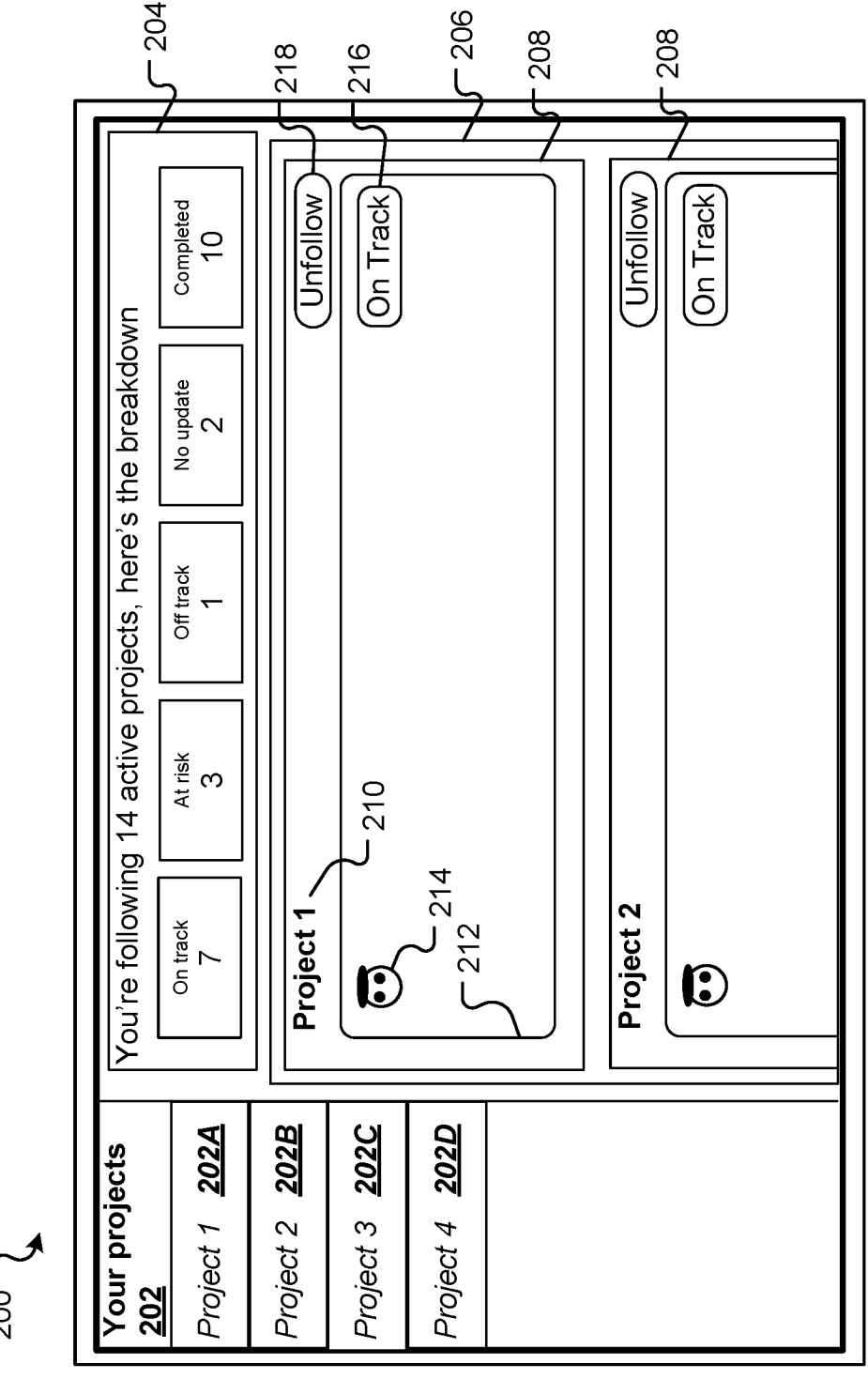
FIG. 2 is an example user interface displayed by a project communication tool (PCT) application for an example project.

FIG. 2 illustrates an example project dashboard 200. The dashboard includes a projects section 202 that displays a list of projects owned by a user viewing the dashboard 200. In this example, the user owns four projects—projects 202A-202D. The dashboard further includes a summary section 204 displaying a summary of the active projects the user viewing the dashboard 200 has subscribed to follow. In this example, 13 of the projects the user has subscribed to follow are active and 1 project has been completed in the last week, and therefore the summary section 204 includes a status summary for each of these 14 active and recently completed projects. The dashboard further includes a detailed projects section 206.

The detailed projects section 206 displays project cards 208 for each project the user has subscribed to. The project cards 208 include summarized information about the corresponding project. This may include, e.g., a project name 210, a recent update section 212, an avatar section 214, a status indicator section 216, and an unfollow control 218.

The project name section 210 displays the project field data relating to the project name of the selected project. The recent update section 212 displays the update description relating to the most recent project update submitted by the project owner for the selected project. The avatar section 214 may display an avatar or picture of the person or team that created the update. The status indicator section 216 displays project data relating to the project status of the selected project. The unfollow control 218 allows a user to unfollow (e.g. unsubscribe from) the selected project. Selection of the unfollow control 218 triggers the user to be unsubscribed from the project such that the user does not receive any further updates on the project.

The PCT may also display a goal dashboard in a similar manner.

In some cases, a person may use the ITS to manage tasks, but may use the PCT to communicate status updates about the task to other users and to monitor progress of goals. In such cases, the user creates an issue in the ITS system and then also has to create a project in the PCT for the same task. This involves the user first creating the issue on the ITS, and adding information such as the title, description, assignee, status, etc., and then using some of the same information to manually create a corresponding PCT project.

Subsequently, the user primarily works on the task in the ITS (e.g., using the issue) and periodically visits the PCT to create updates about the task (e.g., using the corresponding project), which can be communicated to subscribers. Further, if any changes are made to the ITS issue that also affect the corresponding PCT project, the user has to manually update those fields by logging into the PCT application.

Accordingly, the user has to constantly switch between the two applications to perform various tasks, but doing so can be inconvenient or unmanageably complex. Further, if a user makes a change to the task in the ITS system (e.g., the user changes the status of the issue and/or an estimated completion date), but forgets to do so in the PCT or vice versa, the two computer applications may provide conflicting information to users, which may not only be confusing (and add to their cognitive burden), but may also result in more drastic project management errors.

To address one or more of these issues, aspects of the present disclosure provide an auxiliary module provided by a first computer application that can be installed and executed on a second computer application. The auxiliary module, when executed and installed by the second computer application, configures the second computer application to display one or more interactive UI elements provided by the first computer application on a UI provided by the second computer application. The first computer application can control the information displayed in the interactive UI elements. This way, the first computer application can provide information available at the first computer application for display in a UI provided by the second computer application. Further, the interactive UI elements can provide user controls that allow users to use the functionality provided by the first computer application. This way, functionality associated with the first computer application can be provided via a UI provided by the second computer application.

Using the auxiliary component, user can view information associated with the first computer application and utilize functionality provided by the first computer application directly from a UI of the second computer application without leaving the context of the second computer application.

The auxiliary module is also configured to provide two-way synchronization between the two computer applications, such that updates in the first computer application are automatically communicated to the second computer application in near real time and updates from the second computer application are automatically communicated to the first computer application in near real time. This way, any changes made in the first computer application can be reflected in the second computer application and vice versa. In some embodiments, the synchronization may be one-way, e.g., updates made in a first computer application are automatically communicated to the second computer application, but updates made in the second computer application are not communicated to the first computer application. This way, any changes made in the first computer application can be reflected in the second computer application but not vice versa.

Further still, the auxiliary module allows objects provided by the first application to be linked to objects provided by the second application. This way, when a user is viewing a UI displayed by the first application, they can easily view objects from the second application that are linked to a particular object in the first application and vice versa.

To this end, aspects of the present disclosure assign one of the computer applications as a primary computer application and the other computer application can be assigned as a secondary computer application. The primary computer application provides the auxiliary module and the secondary computer application executes the auxiliary module and provides a unified frontend experience to the user. Further both applications are configured to communicate updates to the other application in order to synchronize the information provided by both computer applications.

In the context of an ITS and PCT, the PCT is the primary computer application, whereas the ITS is the secondary computer application. When the auxiliary module is installed on the ITS, the ITS is configured to display PCT UI elements in an ITS UI. Using the PCT UI elements, a user can synchronize an ITS issue with an existing PCT project or unsynchronize the ITS issue from an existing PCT project. Similarly, the user can link an ITS issue to a PCT goal or unlink the issue from the PCT goal. The user can also create a new PCT project or a new PCT goal directly from the ITS UI and synchronize the ITS issue with the newly created PCT project or link the ITS issue to the newly created PCT goal.

Once an issue is synchronized with a PCT project, any updates made to the issue are communicated to the PCT so that the PCT can determine if the corresponding PCT project needs to be updated. Similarly, any updates made to the PCT project are communicated to the ITS so that the ITS can determine if the corresponding ITS issue needs to be updated.

Aspects of the present disclosure disclose processes for creating new objects in the primary computer application using the secondary computer application, synchronizing these objects with corresponding objects in the secondary computer application, updating the objects in the primary and/or secondary computer application whenever a user makes any changes to either object in either computer application, and retrieving features/services from the primary computer application to display in a UI displayed by the secondary computer application.

These and other features of the presently disclosed systems and methods will be described in detail in the following sections with reference to FIGS. 3-16. Further, it will be appreciated that features of the presently disclosed systems and methods are described time and again in this disclosure with respect to an ITS as a primary computer application and a PCT as a secondary computer application. In such examples, the object maintained by the ITS is referred to as an issue and the object maintained by the PCT is referred to as a project or a goal. However, it will be appreciated that this is merely exemplary and the described systems and methods can just as easily apply when the PCT is the secondary application and the ITS is the primary application. Further, it will be appreciated that aspects of the present disclosure can be utilized to integrate any other two or more computer applications without departing from the scope of the present disclosure.

Example Systems

Figure 3:
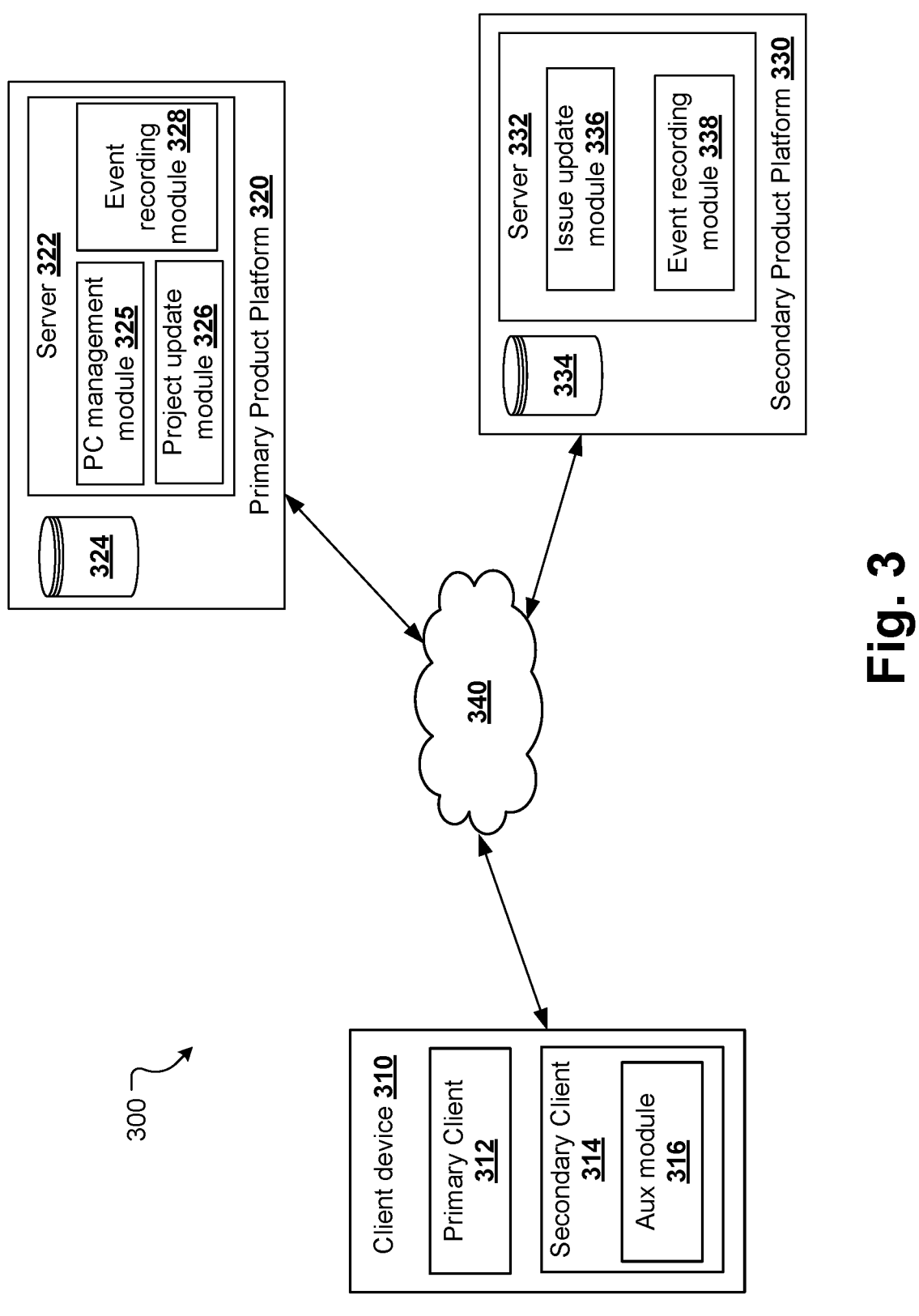
FIG. 3 is a block diagram depicting a networked environment in which various features of the present disclosure may be implemented.

FIG. 3 illustrates an environment 300 in which one or more aspects of the present disclosure are implemented. Specifically, FIG. 3 illustrates the systems involved in integrating two computer applications and providing information and functionality of one application in another and synchronizing data between the two applications. The systems include a client device 310, a primary product platform 320, and a secondary product platform 330. The client device and product platforms communicate with each other over one or more communication networks 340.

The client device 310 may be any device suitable for performing client-side operations described herein, for example a mobile device (e.g. a tablet or mobile phone), a portable device (such as laptop computer), or any other computing device (e.g. a desktop computer).

Generally speaking, users of the client device 310 are associated with one or more user accounts and generate and/or communicate electronic content to one or more of the product platforms 320, 330. This activity includes any type of user account interaction with the product platforms 320 or 330, including interaction with content and/or software applications hosted by the product platforms 320, 330. Example interactions include accessing/viewing and/or contributing to one or more issues or projects hosted by the product platforms, using one or more services offered by the product platforms 320, 330 (such as managing issues, updating projects, creating digests, viewing project updates, etc.)

In order to allow users to perform these functions, as illustrated in FIG. 3, the client device 310 includes one or more client (software) applications (e.g., primary client 312, and secondary client 314) that are configured to access software applications made available by the product platforms 320, 330, respectively. Further, the secondary client 314 includes an auxiliary module 316 that is provided by the primary product platform 320. When the auxiliary module 316 is installed and executed by the secondary client 314, the secondary client 314 acts as an integrated client and will be referred to as such in the remainder of the disclosure. Integrated client 314 may communicate with the software applications hosted by the product platforms 320 or 330, render UIs based on instructions received from the applications, and receive inputs from user accounts allowing them to interact with the applications hosted by the product platforms 320 or 330. For instance, the integrated client 314 may generate and render a unified frontend or UI (e.g., see FIGS. 7, 8, 10, 14, and 15) to view data that are powered or provided by the product platforms 320, 330.

The primary and secondary clients 312, 314 include instructions and data stored in the memory (e.g. non-transient computer readable media) of the client device 310 on which the applications are installed/run. These instructions are executed by a processor of the client device 310 to perform various functions as described herein. By way of example, some functions performed by the primary client 312 include communicating (using a communication interface such as 418 described below) with the primary product platform 320 (and, in particular, primary server 322). Some functions performed by the integrated client 314 include communicating with the primary server 322 and communicating with secondary server 332, rendering UIs based on instructions received from the primary and secondary servers 322, 332, and receiving inputs from users to interact with content made available by the primary and secondary servers 322, 332.

In certain embodiments, where the primary and secondary computer applications are PCT and ITS, respectively, the integrated client 314 renders ITS UIs that show one or more issues, display information provided by the PCT server 322, allow users to create PCT projects and/or goals, allow users to synchronize ITS issues with PCT projects, allow users to link ITS issues with PCT goals, etc.

The clients 312, 314 may be implemented in various ways. For example, the clients 312, 314 may be web browser applications (such as Chrome, Safari, Internet Explorer, Firefox, or an alternative web browser), which access the applications hosted by the product platforms 320 or 330 via appropriate uniform resource locators (URL) and communicate with the platforms via general world-wide-web protocols. In this case, the web browser application is configured to request, render and display UIs that conform to a markup language, and may be capable of internally executing browser-executable code, or other forms of code. Alternatively, the clients 312, 314 may be specific applications programmed to communicate with the product platforms 320 and/or 330 using defined application programming interface (API) calls.

While client device 310 has been shown with separate primary and secondary clients 312, 314, a single application may be used as both these client applications (e.g. a web browser, in which case the corresponding primary and secondary servers 322, 332 are web servers).

In general, each product platform 320, 330 is a system entity that hosts one or more software applications and/or content. Each product platform 320, 330 may include one or more servers (e.g., 322 and 332) for hosting corresponding software application(s) and one or more storage devices (e.g., data stores 324 and 334) for storing application specific data. Examples of software applications hosted by product platforms 320, 330 may include project communication tools (e.g., Atlas), incident management systems (e.g., OpsGenie), software code management system (e.g., Bitbucket), and issue tracking applications (e.g., JIRA). Atlas, Jira, OpsGenie, and BitBucket are all offered by Atlassian, Inc. It will be appreciated that the software applications need not be offered by the same organization and can be used with any product platforms 320, 330.

The product platforms 320, 330 also store product data. Product data generally includes: data defining the operation of the hosted application (for example, user accounts, user permissions, and the like); and application data (e.g., the content hosted/maintained by the application, which can be, for example, issue data (in an ITS product platform), or project and goal data (in a PCT). The data is stored on and managed by data stores 324, 334. Data stores 324, 334 may be provided by a database server (not shown) which may be hosted by server 322, 332, but is more typically hosted on a separate physical computer in communication (directly or indirectly via one or more networks 340) with the servers 322, 332. In one example, the data stores 324, 334 store associations between issues and projects and/or goals as discussed below.

To run a PCT, the server 322 includes one or more application programs, libraries, APIs, or other software elements that implement the features and functions of the PCT application. This involves receiving and responding to requests from client applications (e.g. client 312), and communicating with the ITS server 332.

In this example, PCT server 322 includes a PC management module 325, a project update module 326, and an event recording module 328. Generally speaking, the PC management module 325 is configured to collect project data when a project is created and store the collected project data on the data store 324. As an example, the PC management module 325 may be configured to write the project data to a project details record in a project details table stored on the data store 324.

The project update module 326 is configured to periodically prompt a project owner (e.g. through the client 312 on client device 310) to provide a project update relating to their project. The project update module 326 is also configured to receive project updates e.g., from a project owner (e.g. using the client 312 on client device 310) or from the ITS server 332 and store the project updates on the data store 324. As an example, the project update module 326 may be configured to write each received project update to a project update record in a project updates table stored on the data store 324.

The event recording module 328 monitors updates made projects or goals managed by the PCT server 322 and forwards event records of each of these updates to the ITS server 332. The event recording module 328 may be configured to communicate these updates in real time or in batches periodically.

In the present example, the PC management module 325, the project update module 326, and the event recording module 328 have been described as modules of the server 322—for example add-ons, plug-ins, or other software components that integrate with and expand the functionality of the server 322. The functionality provided by one or more of these modules could, however, be performed by separate/stand-alone applications. As a further alternative, the functionality provided by one or more of these modules could be native functionality of the server 322.

To run an ITS, the server 332 includes one or more application programs, libraries, APIs, or other software elements that implement the features and functions of the application. This involves receiving and responding to requests from client applications (e.g. client 314), and communicating with the PCT server 322. In one example the ITS server 332 includes an issue update module 336 and an event recording module 338. The issue update module 336 is configured to receive issue updates e.g., from an issue assignee/reporter (e.g. using the client 314 on client device 310) or from the PCT server 322 and store the issue updates on the data store 334. As an example, the project update module 336 may be configured to write each received issue update to an issue record in an issues table stored on the data store 334.

The event recording module 338 monitors any user updates made to one or more issues managed by the ITS application hosted by the server 322 and forwards event records of each of these user account interactions to the PCT server 322. The event recording module 338 may be configured to communicate the event records to the PCT server 322 in real time or in batches periodically.

While single server architecture has been described herein, it will be appreciated that one or both of the product platforms 320, 330 can be implemented using alternative architectures. For example, in certain cases a clustered architecture may be used where multiple server computing instances (or nodes) are instantiated to meet system demand. Conversely, in the case of small enterprises with relatively simple requirements a product platform 320, 330 may be a stand-alone implementation (e.g., a single computer directly accessed/used by the end user).

As illustrated in FIG. 3, communications between the various systems 310-330 are via the communication network 340. The communication network 340 is depicted as a single network in FIG. 3 for ease of depiction. However, in actual implementation, the various systems illustrated in FIG. 3 may communicate with each other over different communication networks. For example, the product platforms 320, 330 may communicate with each other through a local area network (LAN), whereas they may communicate with the client device 310 via a public network (e.g., the Internet). Furthermore, the product platforms 320, 330 may communicate with each other over open web protocols such as (HTTPS, REST, and JWT).

Although the description above may suggest that the client device 310 and in particular the integrated client 314 communicates with either product platform 320, 330, in actual implementation, the integrated client 314 is configured to only interact with the secondary product platform 330, whereas the primary and secondary product platforms 320, 330 may interact with each other in the background. In this manner, the user only needs to interact with the secondary product platform 330 whilst enjoying the functionalities provided by the primary product platform 320 as well.

It will be appreciated that although only one client device 310, and one secondary product platform 330 has been depicted, in normal operation, many more client devices 310 and secondary product platforms 330 may be connected to the primary product platform 320 through the network 340.

The operations/techniques described herein are implemented by one or more special-purpose computing systems or devices. For example, in environment 300: the client device 310 is a computer system; and the product servers 322, 332 are provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired, and/or program logic to implement relevant operations.

Figure 4:
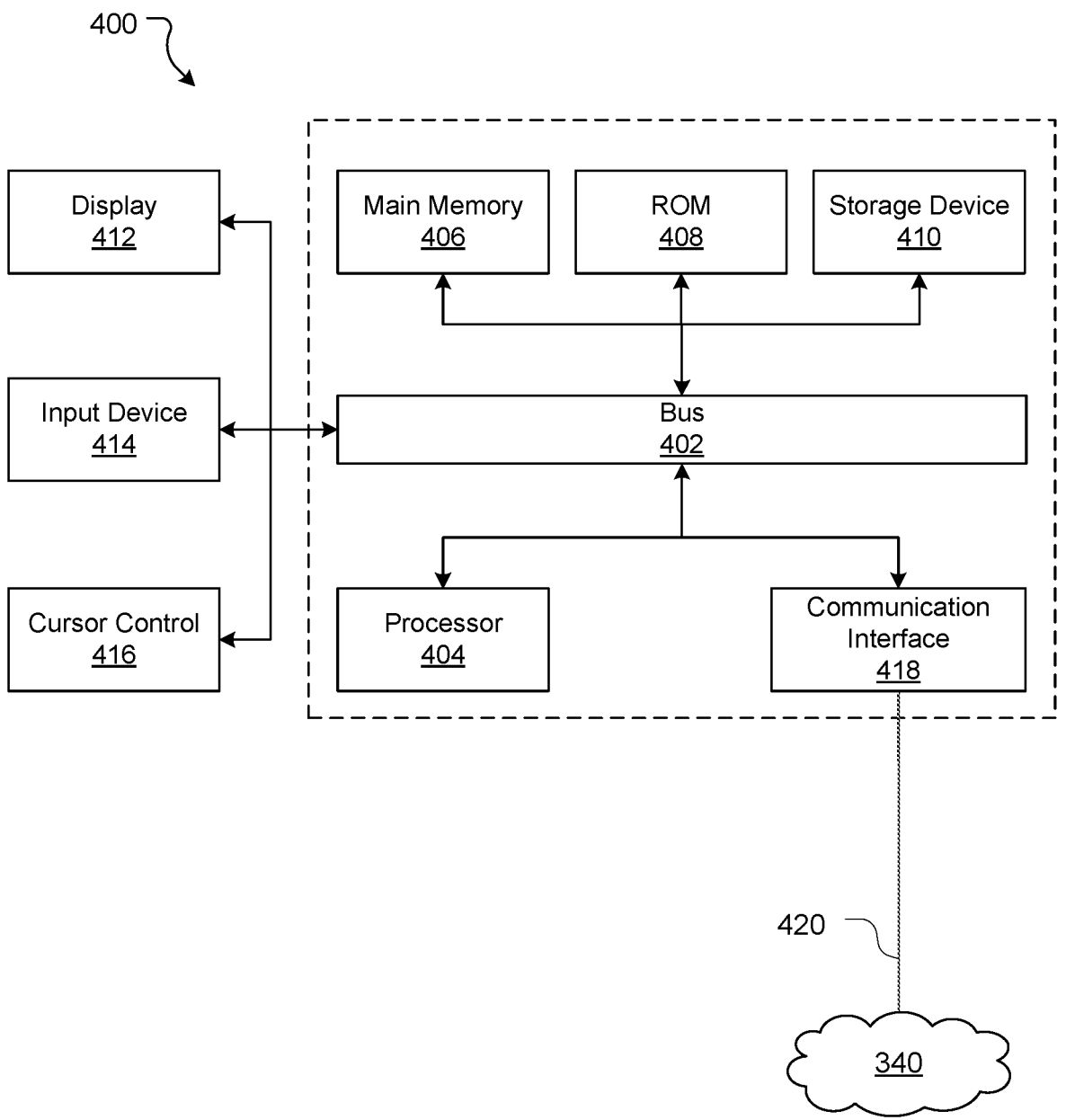
FIG. 4 is a block diagram of a computer processing system configurable to perform various features of the present disclosure.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. If the computer system 400 is part of the primary server 322, the storage device 410 may store the data store 324.

In case the computer system 400 is the client device 310, it may be coupled via bus 402 to one more output devices such as a display 412 for displaying information to a computer user. Display 412 may, for example, be a cathode ray tube (CRT), a liquid crystal display (LCD), a light emitting diode (LED display), or a touch screen display. An input device 414, including alphanumeric and other keys, may be coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory computer readable media that stores data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, hard disk, solid state drive, magnetic tape, or any other magnetic data storage medium, a CD-ROM, any other optical data storage medium, any physical medium with patterns of holes, any other memory chip, or cartridge.

Storage media is distinct from but may be used in conjunction with transmission media. Transmission media participates in transferring information between storage media. For example, transmission media includes coaxial cables, copper wire, and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to network 340. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks 340 to other computing systems. For example, if the computer system 400 is part of the primary server 322, the network link 420 may provide a connection through network 340 to the secondary product server 332 or the client 312.

Computer system 400 can send messages and receive data, including program code, through the network(s), network link 420, and communication interface 418. In the consolidation system example, it may receive event data through the network 340 and communication interface 418 from the primary server 322.

The processor 404 of the secondary server 332 may execute the received event data as it is received, and/or store it in storage device 410, or other non-volatile storage for later execution.

ITS and PCT Data Structures

The ITS 330 maintains metadata defining the operation of the ITS. In one embodiment this metadata includes: one or more issue type definitions, each issue type definition defining a field scheme or field configuration for issues of that type (e.g., the possible fields or data to be maintained by the ITS for issues of a given type); one or more workflow definitions, a workflow definition defining the workflow of an issue of a particular issue type (e.g., the states an issue can take and the manner in which an issue transitions between those states over its lifecycle); and user permissions (e.g., which users have permissions to create issues, view issues, amend issues, change the states of issues etc.).

Further, the ITS 330 maintains a list of issues created on the ITS. For each issue in the list, the ITS 330 may be configured to store a wide variety of information. By way of one simple example, an issue may include an issue type definition which may define the following fields: an application/service field storing an application/service associated with the issue; a key field storing a unique identifier for the issue; a title field storing a title of the issue; a description field storing a description of the issue and actions taken with respect to the issue; a status field indicating the stage the issue is currently at in its lifecycle; an assignee field indicating who (if anyone) the issue is assigned to; a priority field storing the priority of the issue at a general level (e.g.

very high, high, medium, low, very low); and an estimated completion date field storing a date in respect of the issue (defining a date by which the assignee of the issue considers the issue will be completed). The actual fields defined with respect to an issue type will depend on the requirements of a given ITS implementation, and many other fields are possible.

An ITS may maintain this list of issues in a variety of data structures. In one embodiment, issue data/records are stored in a relational database (e.g., in data store 334). The table below provides an example of a simple single table data structure for storing issues:

TABLE A

| Example issue data structure | | | | | |
|---|---|---|---|---|---|
| Key | App/Service ID | Description | Status | Priority | Date/ . . . . . . time |

When a particular issue is synchronized with a project managed by the PCT, the data store 334, may further store a project correspondence table that stores the identifier of the issue and the identifier of the corresponding project it is synchronized with. The table below provides an example of a table data structure for storing this information:

TABLE B

| Example project correspondence table | |
|---|---|
| Issue ID | Project ID |

Similarly the PCT stores project data—e.g. data defining project fields in the data store 324 in any appropriate data structure (or set of related data structures). By way of example, project fields may include fields such as— a unique project identifier field for storing an identifier used to uniquely identify a project. The unique project identifier is typically automatically generated when creating a project and may, or may not, be visible to users.

A project owner field for storing a user identifier of an individual (or a team) who is assigned the role of project owner. The project owner may be the same as the creator of a project or a different user, and may change over time.

A project name field for storing a name for the project.

A target date field for storing an estimated date by when the project is supposed to be completed.

A project goal field for storing a description of a goal of the project (e.g., a desired outcome of the project).

A project purpose field for storing a description of the purpose of the project (e.g., why the project is necessary).

A project worker field for storing identifiers (e.g., user identifiers) of one or more individuals and/or teams working on the project.

A project success definition field for storing a description of what will make the project successful (e.g., how success will be measured).

A project subscribers field for storing identifiers (e.g. user identifiers) of individuals and/or teams who have subscribed (e.g. are following/watching) a project. A project subscriber could be any interested stakeholder, for example, an internal stakeholder (e.g., within the organization) or an external stakeholder (e.g., outside the organization).

A project status field for storing a value indicating a current status of the project. For example, a project status may be selected from a set of system or user defined status values. Example status values may include, but are not limited to, statuses such as "on track", "at risk", "ahead of schedule", "behind schedule", "completed on schedule", "completed behind schedule", or the like. It will be appreciated that other status values may be used. A project creator and/or owner may be able to add custom status values.

A project updates field for storing periodic project updates (e.g. descriptions) submitted by the project owner.

A common goal(s) field for storing identifier(s) of one or more common goals of the organization that the project has been assigned to. The present project, along with other projects, may contribute to achieving a common within the organization.

It will be appreciated that the above list is not exhaustive and that a project may include additional and/or alternative project fields. Further, while some project fields may be made mandatory/required not all will be.

The PCT may store similar fields for goals. The typical fields for goals include e.g., a unique goal identifier, a goal name, a goal target completion date, linked projects (including e.g., a list of project identifiers of projects linked to the goal), linked issues (including e.g., a list of issue identifiers of issue linked to the goal), an owner identifier, etc.

The PCT generally provides a default set of fields (optional and required) for projects and goals being created—for example a set of fields such as the above (though alternatives are possible). In addition, the PCT may be configured to provide a mechanism for users (or, at least, appropriately permissioned users) to change the default fields and/or add custom project or goal fields. Generally speaking, any fields that are deemed to be useful for communicating information about a project or goal may be created and defined as optional or required fields.

The project and goal data may be stored in a set of related database tables as set out below. In this example, a project details table stores project details records defining various data in respect of a project. For example, each project details record may store the following data:

TABLE C

| Example project data table | | | | | | |
|---|---|---|---|---|---|---|
| Project ID | Project owner user ID | Project name | Project Goal | Project Purpose | Success definition | Project status |

A project worker table associating workers (e.g. individuals and/or teams) with projects. In this example, each worker table record includes a project identifier and a user identifier of a user (worker) working on the identified project. For example:

TABLE D

| Example worker data table | |
|---|---|
| Project ID | Worker user ID |

A project update table storing project updates submitted by project owners (either via the PCT client 312 or the ITS client 314). The project update table defines project update records, each of which includes: a project identifier; an update timestamp recording the time and/or date the project update was submitted; an update description providing details of the project update; and a project status defining the project status of the project at the time of the update. Below is an example of a project update table.

TABLE E

| Example project update data table | | | |
| --- | --- | --- | --- |
| Project ID | Project update timestamp | Update description | Project status |

The PCT server 322 also maintains goal data in relational tables. For example, each goal record may store the following data:

TABLE F

| Example goal data table | | | | | | |
| --- | --- | --- | --- | --- | --- | --- |
| Goal ID | Goal owner user ID | Goal name | Goal Status | Target date | Linked projects | Linked issues |

Although the linked projects and linked issues fields are depicted in the same data table above, it will be appreciated that separate data tables may be maintained for each of the goal fields.

When a particular project is synchronized with an issue managed by the ITS, the data store 324, may further store an issue correspondence table that stores the identifier of the project and the identifier of the corresponding issue it is synchronized with. The table below provides an example of a table data structure for storing this information:

TABLE G

| Example issue correspondence table | |
| --- | --- |
| Project ID | Issue ID |

Similarly, when a particular goal is linked with one or more ITS issues, the data store 334 may further store a goal correspondence table that stores the identifiers of the goals and the one or more ITS issues they are linked to. The table below provides an example of a table data structure for storing this information.

TABLE H

| Example goal correspondence table | |
| --- | --- |
| Goal ID | Linked Issue ID(s) |

The creation of additional issue, project, or goal data fields will cause associated tables to be created in order to store data for those fields. For example, and very generally speaking, each additional field that is created by a user may cause creation of one or more new tables that define records that include an issue, project or goal identifier and the data that is sought to be captured.

Additional and/or alternative data structures (with additional and/or alternative fields) may be used to store issue, project, or goal data. Furthermore, while in the example above a relational database model has been used alternative database models could be used (e.g. a key-value pair data store or alternative database model).

Example Methods

Figure 5:
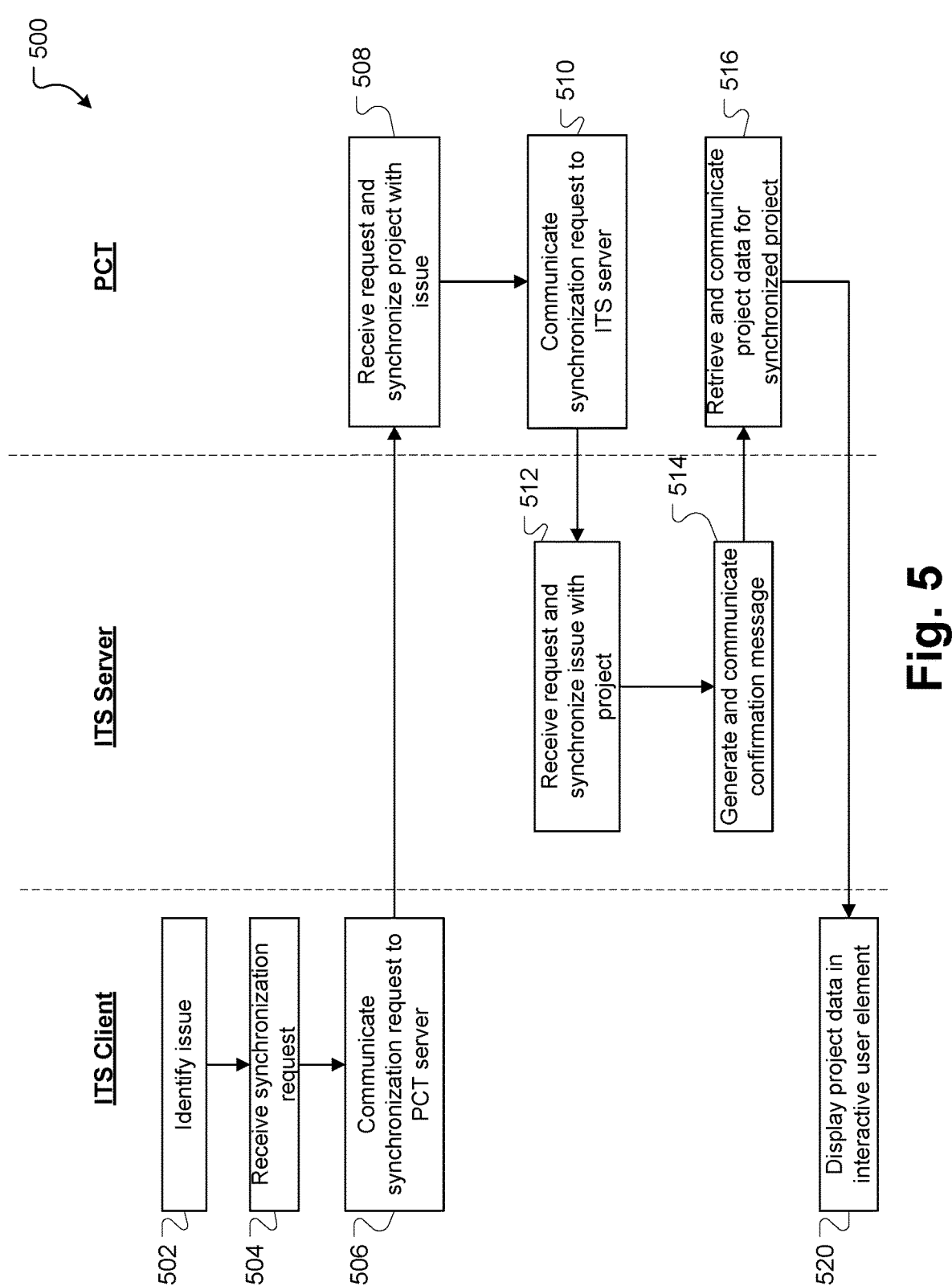
FIG. 5 is a flowchart illustrating an example method for synchronizing an object maintained by a first computer application with an object maintained by a second computer application according to aspects of the present disclosure.
Figure 8:
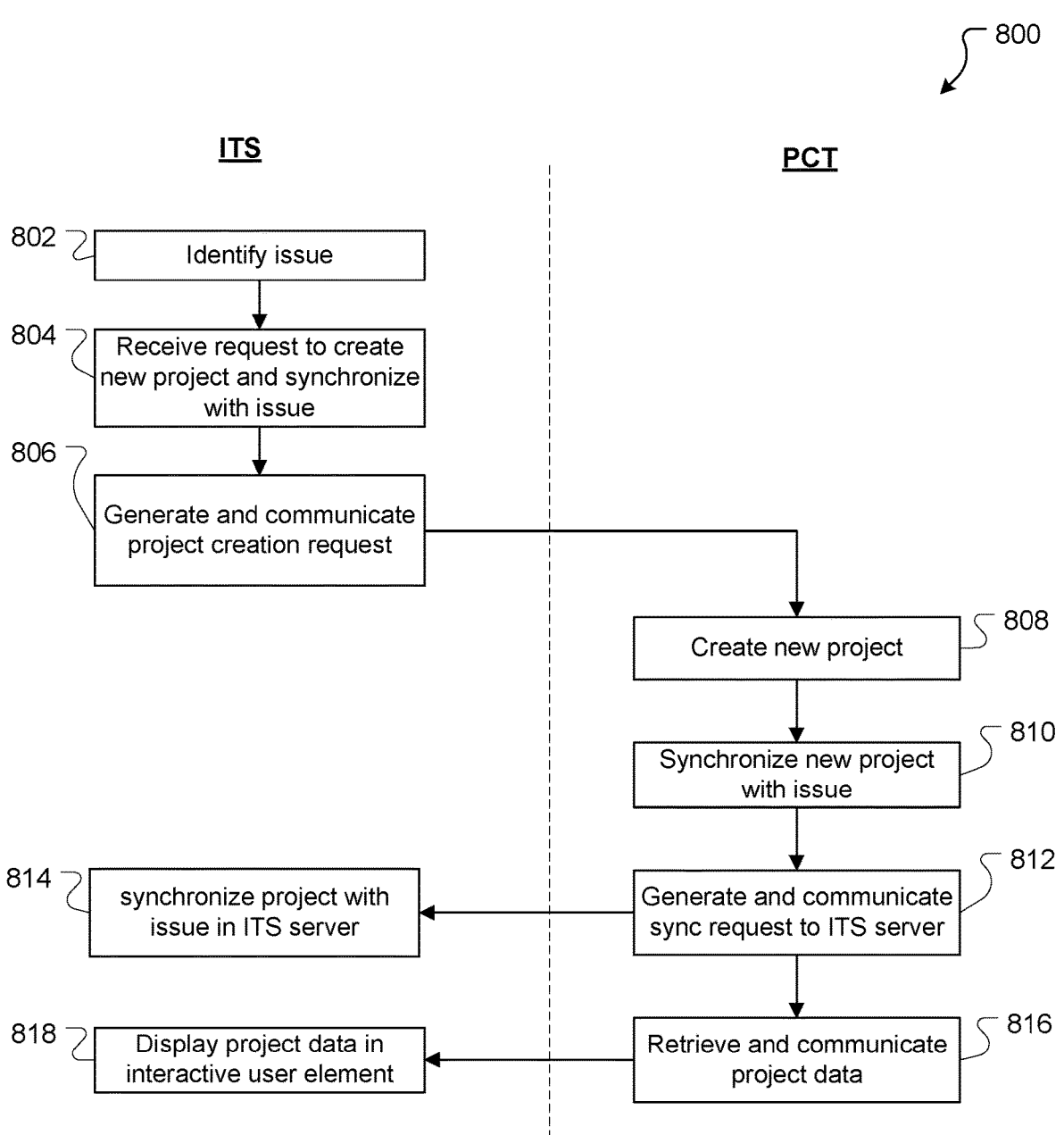
FIG. 8 is a flowchart illustrating an example method for creating an object maintained by a first computer application using a client of a second computer application and synchronizing the created object with an object maintained by the second computer application.
Figure 10:
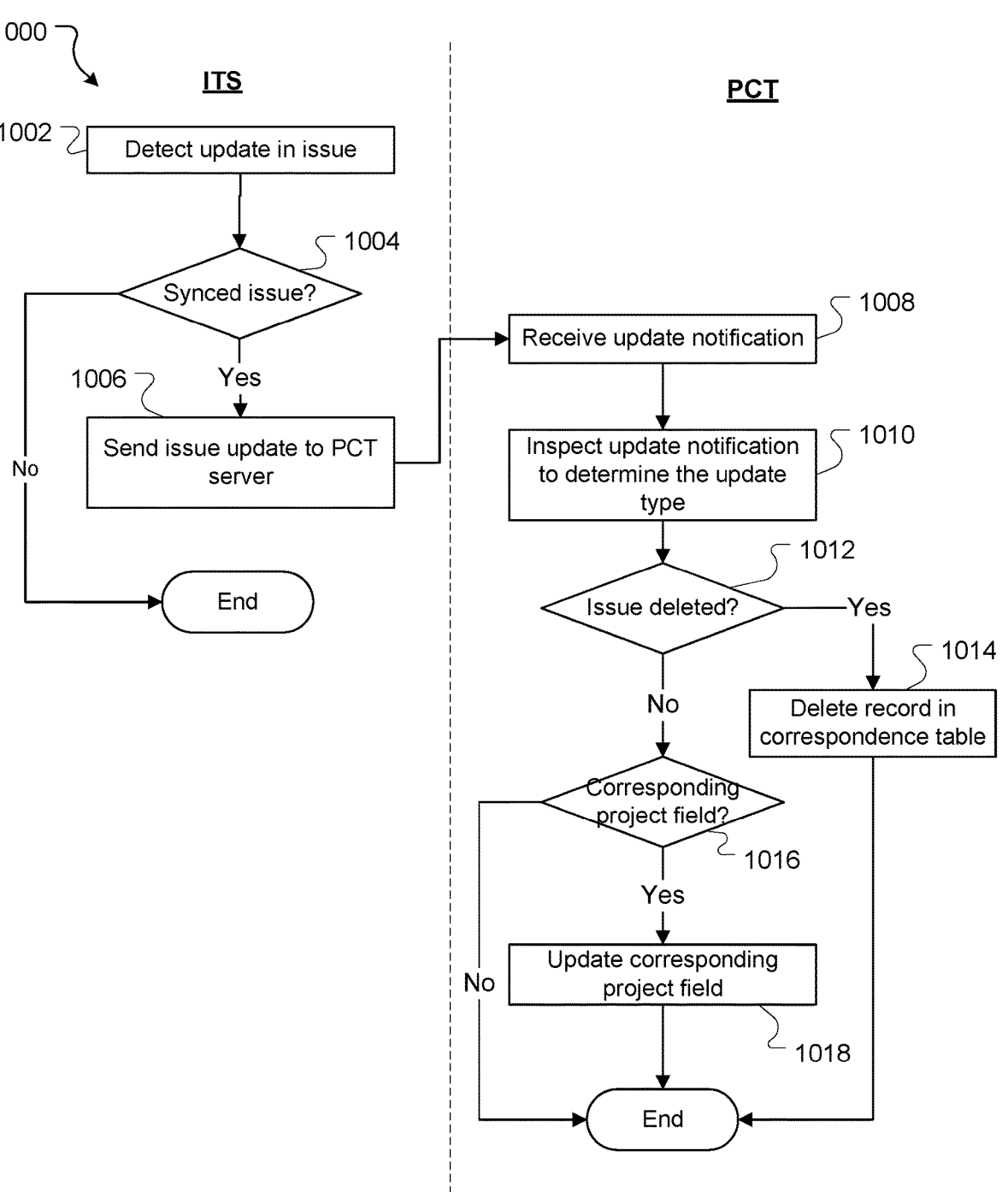
FIG. 10 is a flowchart illustrating an example method for updating an object maintained by a first computer application when a synchronized object maintained by a second computer application is updated.
Figure 11:
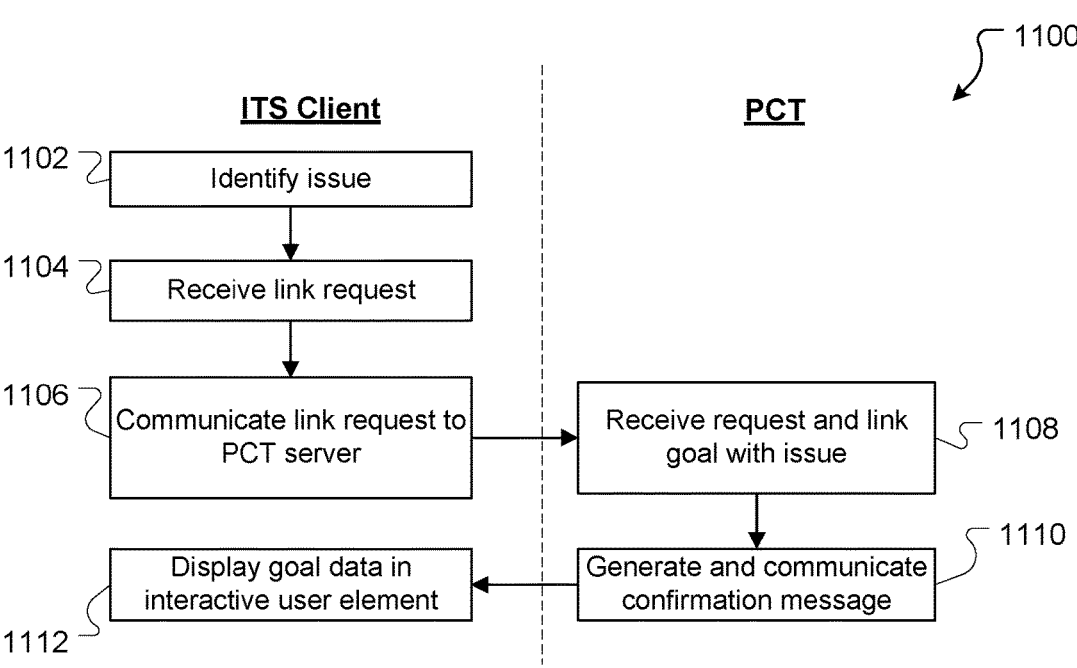
FIG. 11 is a flowchart illustrating an example method for linking an object maintained by a first computer application with an object maintained by a second computer application according to aspects of the present disclosure.
Figure 12:
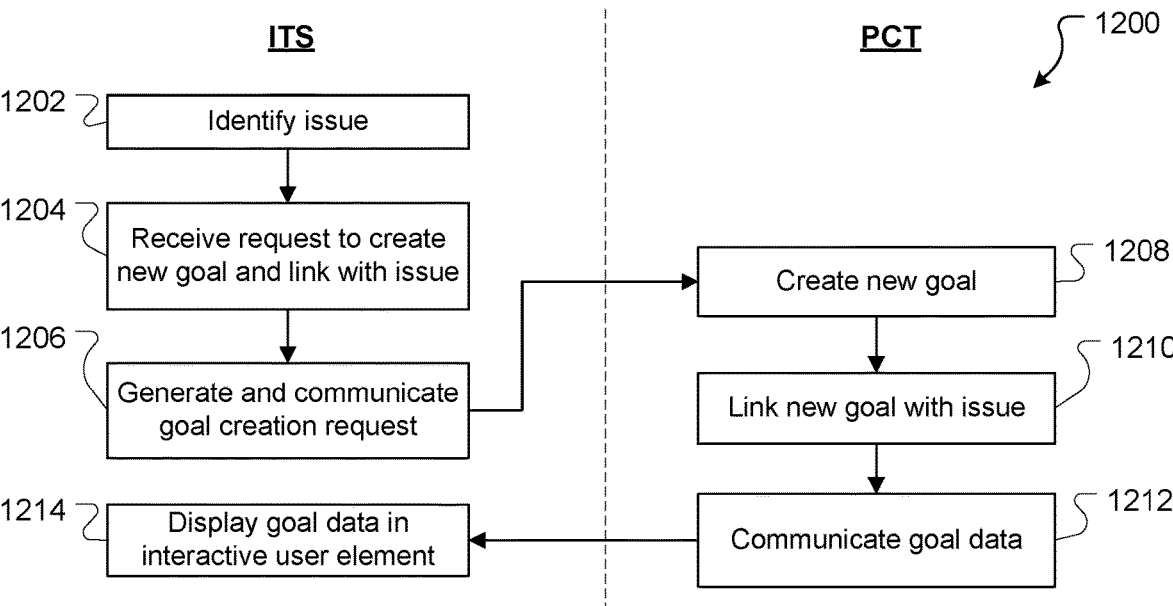
FIG. 12 is a flowchart illustrating an example method for creating an object maintained by a first computer application using a client of a second computer application and linking the created object with an object maintained by the second computer application.

Various methods for providing an integrated front end for independent backend computer applications will now be described. FIGS. 5 and 11 describe example methods for associating an existing object in the primary computer application with an object in the secondary computer application using the secondary client 314. In particular, FIG. 5 describes a method for synchronizing the objects such that values of one or more data fields of the two objects are synchronized and FIG. 11 describes a method for linking the objects such that a correspondence between the two objects is maintained by at least the primary computer application. FIGS. 8 and 12 describe methods for creating a new object in the primary computer application using the secondary client 314 and associating that object to an object in the secondary computer application. FIG. 10 describes a method for updating a synchronized object in the primary computer application in response to an update in the synchronized object in the secondary computer application.

The operations of the methods described with reference to FIGS. 5-15 will be described as being performed by the systems (e.g., client device 310, primary product platform 320, and/or secondary product platform 330) described in FIG. 3. In alternative embodiments, the processing described may be performed by one or more alternative systems (operating in conjunction with systems 310-330 or independently) and/or alternative applications running on those systems.

Further, the methods disclosed herein will be described with reference to example primary and secondary computer applications. In particular, the primary computer application or product platform 320 is considered to be a PCT and the secondary computer application or product platform 330 is considered to be an ITS. Further, the objects maintained by the PCT include projects and goals and the objects maintained by the ITS include issues.

In certain embodiments, an ITS user goes through an initial configuration process in order to configure their ITS client 314/account to be able to receive information from the PCT server 322 and to configure the PCT server 322 to be able to communicate with the ITS server 332. The precise way in which this is done will depend on the ITS 332 and PCT server 322 in question, and the manner in which communication between the systems is to be achieved.

In certain embodiments, the auxiliary module 316 provided by the PCT server 322 is executed and installed on the ITS instance of a user and/or organization. Once installed and executed, the auxiliary module 316 is configured to communicate with the ITS server 332 via API calls. In this case, configuring access for the PCT server 322 involves configuring the ITS server 332 to permit incoming API calls from the PCT server 322.

In some embodiments, the auxiliary module 316 configures the ITS server 332 to use webhooks to send issue update notifications to the PCT server 322. In this case, configuring access to the PCT server 322 involves interacting with the ITS 332 to generate a shared secret that will be used by the ITS server 332 and the PCT server 322 to create and delete access to web hooks. This shared secret is used by the PCT server 322 to generate access tokens that allow the PCT to communicate with the ITS's APIs. The shared secret is also used by the ITS server to send webhook requests to the PCT server. The PCT server verifies the received shared secret with a stored shared secret and grants access to the webhooks if the received secret matches the stored secret. The shared secret is then used for future communications between the ITS server 332 and the PCT server 322 without the user needing to provide further credentials to enable this.

Once the auxiliary module 316 is installed and executing and the ITS server 332 is configured to permit incoming API calls from the PCT server 322, the user can associate issues maintained by the ITS 330 (e.g. by the ITS server 332 storing data on the ITS data store 334) with projects and/or goals managed by the PCT 320.

FIG. 5 illustrates an example method 500 for creating issue/project association according to some aspects of the present disclosure. FIG. 5 is generally divided into operations performed by the ITS client 314 (with the auxiliary module 316), operations performed by the ITS server 332, and the ITS data store 334 and operations performed by the PCT 320 (e.g., the PCT server 322, and the PCT data store 324).

At 502, an issue that is to be associated with a project is identified. Typically this identification will be achieved by user interaction with a UI provided on the client device 310 by ITS client 314 (in communication with ITS server 332). Such interaction may be by normal ITS mechanisms, e.g., searching or browsing for a particular issue via a navigation interface.

At 504, the ITS client 314 receives (in response to operation of client device 310 by a user) an association request (which is also referred to as a synchronization request when associating a project with an issue in this disclosure) to associate the issue identified at 602 with a project maintained by the PCT 320. In the present embodiment, the synchronization request may be a request to associate the issue with an existing project.

This request can be generated in multiple ways. In one example, a user may be viewing an issue view UI, e.g., interface 100 generated by ITS client 314 that displays information about the issue identified in step 502. The issue view UI may further include a PCT interactive element that is displayed by the auxiliary module 316.

FIG. 6 illustrates one example of an issue view UI 600 configured to facilitate synchronization of an issue with a project. The UI 600 is generated by ITS client 314 (drawing information such as ITS issue data from ITS server 332) which causes the interface to be displayed by the client device 310 (e.g. on a display such as 412). UI 600 generally includes ITS issue data (of the issue being viewed) such as a unique issue identifier 601, an issue name 602, a parent issue name 604 (e.g. the parent issue to which the issue belongs), an issue assignee 606, an issue priority 608 (e.g. highest, high, medium, low, lowest), and an issue's workflow status 610 (e.g., open, in progress, reopened, resolved, closed).

The UI 600 further includes an interactive element 612 that is provided by the auxiliary module 316 (e.g., in communication with the PCT server 322). The PCT interactive element 612 may include a picker search bar 614 that allows users to search for a PCT project they would like to link the current issue to. The PCT interactive element 612 may further or alternatively include a list 616 of projects maintained by the PCT 320 that the user viewing the issue view UI 100 has permission to link to the issue. This list of projects may be determined, e.g., based on the identifier of the user logged into the ITS client 314 and comparing this identifier with the identifiers of project owners stored in the PCT data store 324. In another example, the list 616 of projects may include all projects within the organization that the user viewing the issue view UI 100 has permission to view. Further still, the PCT interaction element 612 may include a user control 618 for creating a new project.

In this example, when a user performs a search for a project via the search bar 614 and selects a project from a list of displayed search results, or selects a project from list 616 (e.g., by contacting, clicking, hovering, keyboard shortcut, or alternative interaction with the search bar 614, or list 616) the auxiliary module 316 is configured to generate a synchronization request to associate the issue identified at step

502 with the selected project. Alternative UIs are, of course, possible, displaying additional and/or alternative ITS issue data and/or controls.

At 506, the auxiliary module 316 communicates the synchronization request to the PCT server 322. In particular, it may communicate an issue identifier of the issue the user is currently viewing in the UI 600 along with an identifier of the selected project with the synchronization request to the PCT server 322.

The PCT server 322 receives the request at step 508 and synchronizes the project with the corresponding ITS issue. This involves, for example, updating the issue correspondence table (e.g., table H) in the data store by including a record of the issue identifier and corresponding project identifier received with the synchronization request.

Once the PCT server 322 synchronizes the issue and project (e.g., by updating the correspondence table), it generates and communicates a synchronization request to the ITS server 322 at step 510. In particular, it may communicate the PCT project identifier and the corresponding ITS issue identifier to the ITS server 322.

The ITS server 332 receives the request at step 512 and synchronizes the issue with the corresponding PCT project. This involves, e.g., updating the project correspondence table (e.g., Table B) by including a record of the issue identifier and corresponding project identifier received with the synchronization request.

ITS server 332 then communicates a confirmation message to the PCT server 322 at step 514. In one embodiment, the ITS server 332 and/or the PCT server 322 may also communicate confirmation messages to the auxiliary module 316 at this stage (not shown). In response to the confirmation message(s), the auxiliary module 316 may update the interactive element 612 to indicate that the issue and project have been successfully linked.

Alternatively, or in addition, once the PCT server 322 receives confirmation of the synchronization from the ITS server 332, the PCT server 322 may retrieve project data associated with the project and communicate this data to the auxiliary module 316 at step 516. The communicated project data may include for example, the name of the project, the status of the project, the estimated completion date of the project, the latest update for the project, and other project details.

The auxiliary module 316 upon receiving the data, displays the project data in the interactive element 612 at step 520.

FIG. 7 illustrates an example issue view UI 700 once an issue is synchronized with an existing project. The UI 700 is generated by ITS client 314 (drawing information such as ITS issue data from ITS server 332) and the auxiliary module 316 (drawing information such as project data from the PCT server 322) which causes the interface to be displayed by the client device 310 (e.g. on a display such as 412). Like, UI 600, UI 700 generally includes ITS issue data (of the issue being viewed). The UI 700 further includes the interactive element 612 that is provided by the auxiliary module 316 (e.g., in communication with the PCT server 322). The PCT interactive element 612 now includes information about the synchronized project, including e.g., the project name 702, the latest update posted on the project 704, a project status 706, and information about the project 708. The PCT interactive element 612 further includes two user controls 710 and 712. User control 710 when selected causes the PCT client 312 to be opened and display a project UI for the corresponding project and user control 712 allows the user to unsynchronize the issue and project.

Method 500 ends once UI 700 is displayed.

In some embodiments, a project may not exist in the PCT 320 that a user can link an issue to. However, the user may wish to create a project in the PCT 320 and then link an issue to that project. In order to do so, the auxiliary module 316 allows a user to create a PCT project directly from the ITS client 314 and then also synchronizes the newly created project with the issue.

FIG. 8 illustrates an example method 800 for doing so. In particular, FIG. 8 illustrates an example method 800 for creating a new project using an ITS client and then synchronizing that new project with an ITS issue. FIG. 8 is generally divided into operations performed by the ITS 330 (e.g., the ITS client 314 with the auxiliary module 316, the ITS server 332 and the ITS data store 334) and operations performed by the PCT 320 (e.g., the PCT server 322, and the PCT data store 324).

Method 800 commences at step 802, where an issue that is to be synchronized with a project is identified. This step is similar to step 502 and therefore is not described again.

At 804, the auxiliary module 316 receives (in response to operation of client device 310 by a user) a request to create a new project and synchronize the new project with the issue identified at step 802. This request can be generated in multiple ways. In one example, a user may be viewing an issue view UI 600 and may select the user control 618 for creating a new project in PCT 320.

Upon receiving the request, the auxiliary module 316 may display a user input form to receive information about the project the user wishes to create. In one example, the auxiliary module 316 may display a pop-up user input form. In another embodiment, the auxiliary module replaces the interactive element 612 with a user input form.

Figure 9:
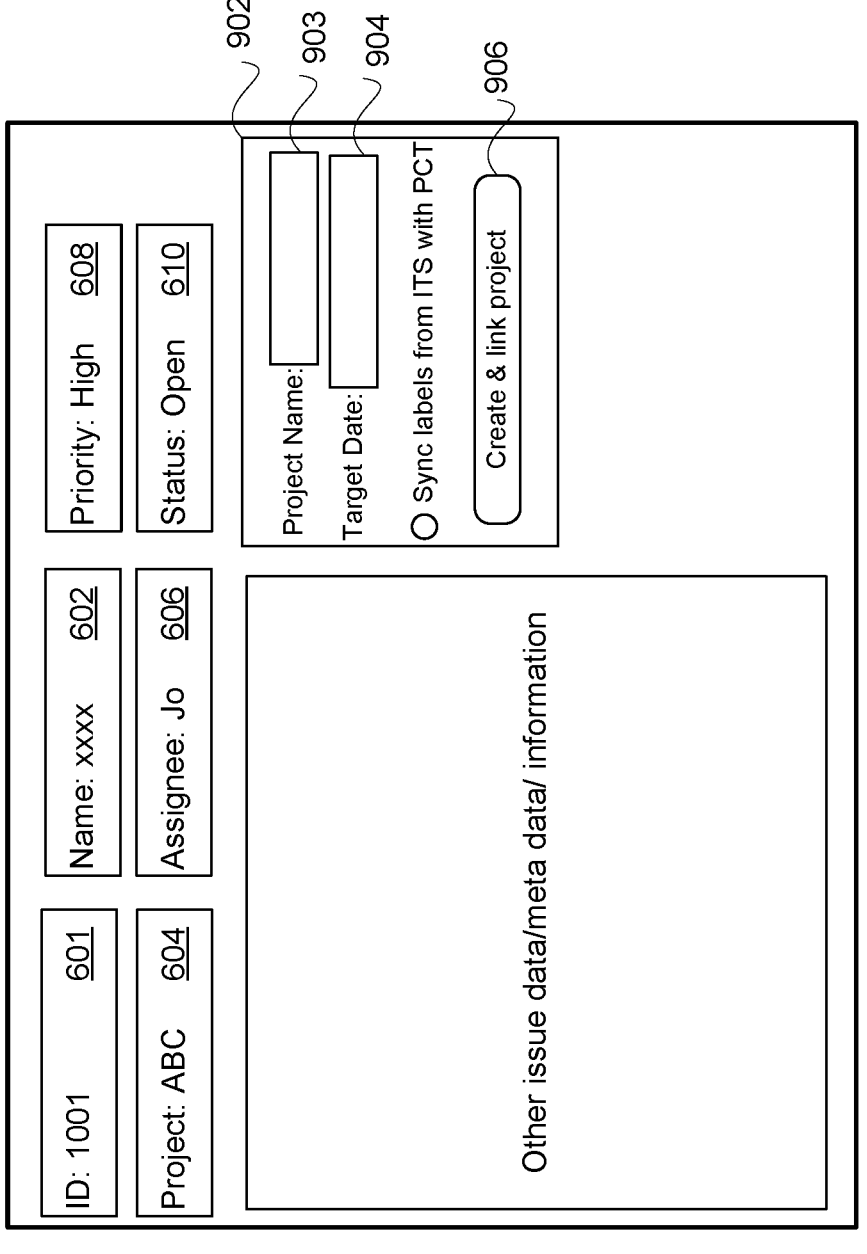
FIG. 9 is another example issue view user interface.

FIG. 9 illustrates an example issue view UI 900 showing the user input form 902. The user input form 902 includes one or more fields that can be automatically completed or filled in by the user. These fields may include, e.g., a project name field 903 to receive a name for the newly created project, and a target date field 904 to receive a date by which the user estimates the project will be completed.

In some instances, the auxiliary module 316 may auto-fill these fields based on corresponding issue fields for the issue the user is viewing. For example, the project name may be auto-completed using the issue name 602 and the target date field may be auto-completed based on the estimated completion date associated with the issue. The user may be able to update any of the fields, e.g., if the user wishes to display a different project name and/or wants to update the target date. The input form 902 may also provide the user with the option to synchronize similar fields between the ITS and PCT, such as, e.g., name, completion date, status, etc. Finally, the input form 902 includes a user control 906 for creating and linking the project to the issue.

At step 806, once the user is satisfied with the project details in the input form 902, the user selects the user control 906. Selection of the user control 906 causes the auxiliary module 316 to generate a project creation request and communicate the project creation request to the PCT server 322.

The project creation request includes the information input by the user in the input form 902, information about the corresponding issue, and an identifier of the user making the request. The auxiliary module 316 may obtain the information about the issue and the user by querying the ITS server 332. The information about the corresponding issue includes, e.g., the issue identifier, the issue name, estimated completion date, issue status, etc.

Upon receiving the project creation request, at step 808, the PCT server 322 creates a new project. This may include creating a new project record in the data store 324. In particular, the PCT server 322 creates a new record in the project data table (e.g., table C) with a new project identifier and records the following project information—project's name (e.g., based on issue name), target date (e.g., based on the issue estimated completion date), project owner (e.g., based on identifier of the user viewing the issue on the ITS client 314), and project status (e.g., based on the issue status).

Once the PCT server 322 updates the project data table it may also synchronize the newly created project with the corresponding issue at step 810. This involves, for example, updating the issue correspondence table (e.g., table G) by adding a record to the table that includes the newly created project identifier and the issue identifier.

The PCT server 322 then generates and communicates a synchronization request to the ITS server at step 812. This request includes the issue identifier and the newly created project identifier. The ITS server 332 receives the synchronization request and synchronizes the issue with the newly created PCT project at step 814. This involves, e.g., updating the project correspondence table (e.g., Table B) by including a record of the issue identifier and project identifier received with the synchronization request.

At step 816, the PCT server 322 retrieves and communicates project data of the newly created and synchronized project to the auxiliary module 316. The auxiliary module 316 then displays the project data in the issue view UI 900 at step 818. These steps (816-818) are similar to steps 516 and 518 of FIG. 5 and therefore are not described here again in detail.

The method 800 then ends. Thereafter, whenever the user views the issue in an issue view UI, the latest information about the synchronized project is displayed in the PCT interactive element 612 as shown in example UI 700.

Methods 500 and 800 are described above based on the assumption that both the ITS and the PCT maintain their own correspondence tables and both these tables are updated whenever an issue and project are synchronized. Further, if a user unlinks or unsynchronized a synchronized project and issue, the correspondence tables in both the systems need to be updated to delete the associated correspondence records. In other embodiments, a central correspondence table may be maintained, e.g., outside the PCT and the ITS. Both systems can then query the central correspondence table to check if synchronization exists between a given issue and project. To avoid confusion, when a central correspondence table is maintained, it may be responsibility of one of the systems (e.g., the ITS or the PCT) to update the correspondence table whenever a new synchronization is created or when a synchronization is broken.

Further, the operations described above are in respect of associating an issue with a project. In certain embodiments, the ITS 330 and PCT 320 may be configured to allow a single issue to be associated with multiple projects and/or a single project to be associated with multiple issues. This can be useful, for example, where a single issue relates to multiple projects or a single project is related to multiple issues.

Methods 500 and 800 described above are in the context of a user associating an issue with a project by initial interaction with the ITS. In an alternative context, a user may associate an issue with a project by initial interaction with the PCT. Where the user is initially interacting with the PCT, the operations described with respect to flowchart 500 and 800 above are (in a very general sense) substantially the same. For example, and at a high level: the client 312 includes the auxiliary module 316. Further, the user is initially interacting with a PCT UI (provided by the PCT client 312); via the PCT UI, a user activates an issue association control which causes the auxiliary module to communicate a synchronization request to the PCT server. The PCT server records the synchronization and communicates a synchronization request to the ITS server. Once both servers record the synchronization, the ITS server communicates issue data to the auxiliary module on the PCT client 312, which displays issue data in an interactive element 612 on the PCT UI.

Turning to FIG. 10, a flowchart 1000 showing the operations performed to update a PCT project when a change is made in an issue in the ITS. FIG. 10 is generally divided into operations performed by the ITS 330 (e.g., the ITS server 332 and the ITS data store 334) and operations performed by the PCT 320 (e.g., the PCT server 322, and the PCT data store 324). In some instances, however, operations may instead be performed by the ITS client 314 or PCT client 312 respectively.

At 1002, the ITS server 332 and in particular the event recording module 338 detects occurrence of an update to an issue. In this context, an update to an issue is any type of change in data recorded with respect to an issue. This may include, for example, a change in the issue name, a change in the issue priority, a change in the assignee of the issue, a change in the status of the issue, a change in the estimated completion date, a new comment, a change in the description or summary of the issue, etc.

Whenever an issue update is detected, the event recording module 338 generates an update notification. In some examples, the update notification includes, e.g., basic information about the issue such as the issue identifier, the issue name, etc., and information about the updated field including e.g., the new value of the field. In other implementations, the update notification includes the entire data record related to the issue (including updated and non-updated fields).

An example of the update notification generated at step 1002 is provided in the table below.

```
{
  "timestamp": 1600073072648,
  "webhookEvent": "ITS:issue_updated",
  "issue_event_type_name": "issue_updated",
  "user": {
    "self":"https://abc",
    "accountId": "abc",
    "avatarUrls": {"https://secure.gravatar.com/avatar"
    },
    "displayName": "Jane Smith",
    "active": true,
    "timeZone": "Australia/Sydney",
    "accountType": "organization ABC"
  },
  "issue": {
    "id": "19090",
    "self": "https://abc",
    "key": "SW-5",
    "fields": {
      "statuscategorychangedate": "2020-09-10T15:15:00.833+1000",
      "issuetype": {
        "self": "https://abc/rest/api/2/issuetype/10000",
        "id": "10000",
        "description": "A big user story that needs to be broken down",
        "iconUrl": "https://abc/images/icons/issuetypes/epic.svg",
        "name": "Epic",
        "subtask": false
      },
      "timespent": null,
      "project": {
        "self": "https://abc/rest/api/2/project/10000",
        "id": "10000",
        "key": "SW",
        "name": "My software project",
        "projectTypeKey": "software",
        "simplified": false,
        "avatarUrls": {
"https://abc/secure/projectavatar?pid=10000&avatarId=10413",
}
      },
      "customfield_10032": null,
      "customfield_10033": null,
      "fixVersions": [ ],
      "aggregatetimespent": null,
      "customfield_10034": null,
      "customfield_10035": null,
      "resolution": null,
      "customfield_10036": null,
      "customfield_10027": null,
```

```
"customfield_10028": null,
"customfield_10029": null,
"resolutiondate": null,
"workratio": −1,
"issuerestriction": {
    "issuerestrictions": { },
    "shouldDisplay": false
},
"watches": {
    "self": "https://abc/rest/api/2/issue/SW-5/watchers",
    "watchCount": 1,
    "isWatching": true
},
"lastViewed": "2020-09-14T18:44:13.744+1000",
"created": "2020-09-10T15:15:00.394+1000",
"customfield_10020": null,
"customfield_10021": null,
"customfield_10022": null,
"customfield_10023": null,
"priority": {
        "self": "https://abc/rest/api/2/priority/3",
        "iconUrl": "https://abc/images/icons/priorities/medium.svg",
        "name": "Medium",
        "id": "3"
},
"customfield_10024": null,
"customfield_10025": null,
"customfield_10026": [ ],
"labels": [
    "demo-desk",
    "hello-world",
    "sd",
    "update-from-watermelon"
],
"customfield_10016": null,
"customfield_10017": null,
"customfield_10018": {
    "hasEpicLinkFieldDependency": false,
    "showField": false,
    "nonEditableReason": {
        "reason": "PLUGIN_LICENSE_ERROR",
        "message": "The Parent Link is only available to Jira Premium users."
    }
},
"customfield_10019": "0|i0002f:",
"aggregatetimeoriginalestimate": null,
"timeestimate": null,
"versions": [ ],
"issuelinks": [ ],
"assignee": null,
"updated": "2020-09-14T18:44:32.646+1000",
"status": {
    "self": "https://abc/rest/api/2/status/10000",
    "description": "",
    "iconUrl": "https://abc/",
    "name": "Backlog",
    "id": "10000",
    "statusCategory": {
        "self": "https://abc/rest/api/2/statuscategory/2",
        "id": 2,
        "key": "new",
        "colorName": "blue-gray",
        "name": "New"
    }
},
"components": [ ],
"timeoriginalestimate": null,
"description": "Hello\\! Derp",
"customfield_10010": null,
"customfield_10011": "CPT",
"customfield_10012": {
    "self": "https://abc/rest/api/2/customFieldOption/10016",
    "value": "To Do",
    "id": "10016"
},
"customfield_10013": "ghx-label-3",
"customfield_10014": null,
"customfield_10015": "2020-09-10",
"timetracking": { },
```

-continued

```
      "customfield_10005": null,
      "customfield_10006": null,
      "customfield_10007": null,
      "security": null,
      "customfield_19090": null,
      "attachment": [ ],
      "aggregatetimeestimate": null,
      "customfield_10009": null,
      "summary": "Labels testing",
      "creator": {
          },
    "changelog": {
      "id": "10119",
      "items": [
          {
          "field": "labels",
          "fieldtype": "jira",
          "fieldId": "labels",
          "from": null,
          "fromString": "hello-world sd update-from-watermelon",
          "to": null,
          "toString": "demo-desk hello-world sd update-from-watermelon"
          }
      ]
    }
}
```

At step 1004, the ITS server 332 determines whether the updated issue is synchronized with a project in the PCT 320. In order to do so, the ITS server 332 may retrieve the issue identifier 601 from the update notification and perform a lookup with that issue identifier with the issue identifiers in the correspondence table (e.g., table B). If the ITS server 332 determines that the updated issue is not synchronized with a project, e.g., because it could not find a match for the issue identifier in the correspondence table, the method 1000 ends.

Alternatively, if the ITS server 332 determines that the updated issue is synchronized with a project, e.g., because it could find a match for the issue identifier in the correspondence table B, the method 1000 proceeds to step 1006, where the ITS server 332 communicates the update notification to the PCT server 322. In certain embodiments the ITS server 332 notifies the PCT server 322 by generation/communication of an API call to the PCT server 322 with the issue update notification. Alternative notification mechanisms may be used, however, for example a publication/subscription type mechanism or other notification mechanism. In certain embodiments, the ITS server 332 communicates the update notification via a webhook—an HTTP POST callback that creates and passes the update notification to the PCT server 322 when the ITS server 332 determines that the issue is synchronized with a project.

At 1008, the PCT server 322 receives/accesses the update notification communicated by the ITS server 332.

At 1010, the PCT server 322 processes the update notification to determine the type of update notification. In particular, the PCT server 322 determines whether notification type is a deletion notification that indicates that the issue has been deleted or if it is a change notification that indicates that one or more fields of the issue have been updated. This can be done by inspecting the update notification. If at step 1012, the PCT server 322 determines that the notification is a deletion notification and the issue has been deleted, the method proceeds to step 1014 where the PCT server 322 deletes the associated correspondence record from the correspondence table G. In one example, it may perform a lookup in the correspondence table G with the issue identifier of the deleted issue and then delete the entire correspondence record that has a matching issue identifier.

Alternatively, if at step 1012, the PCT server 322 determines that one or more fields of the issue have been updated, the method proceeds to step 1016 where the PCT server 322 determines whether the project includes any fields that correspond to the issue fields. In some embodiments, when a user synchronizes an ITS issue with a PCT project, the user may specify which fields of the ITS issue the user wishes to synchronize with the PCT project. For example, a user may decide to only synchronize the estimated completion date between the ITS issue and PCT project, but may choose not to synchronize the ITS issue name with the PCT project name. In such embodiments, at step 1012, the PCT server determines whether the project includes any fields that have been synchronized with corresponding issue fields. In other embodiments, this option may not be provided to users, and all ITS issue fields that have corresponding PCT project fields may be synchronized when the two objects are synchronized. In such embodiments, at step 1012, the PCT server determines whether the project includes any fields that correspond to issue fields.

In either embodiment, the PCT server 322 may maintain a field correspondence table in the data store 334 that provides a mapping between issue fields and project fields the user wishes to synchronize (in some embodiments) or a mapping between all issue fields that have corresponding project fields (in other embodiments). For example, an 'issue name' field may be mapped to a 'project name' field. Similarly, an 'estimated completion date' for an issue may be mapped to a 'target date' for the project, 'an issue status' may be mapped to a 'project status' field and an issue 'assignee' field may be mapped to a project 'owner' field.

Accordingly, at step 1016, the PCT server 322 may inspect the field correspondence table to check if any of the updated issue fields match the issue fields in that correspondence table. If the PCT server 322 identifies a match, it determines that one or more of the updated issue field(s) have corresponding project fields and the method proceeds to step 1018, where the PCT server 322 updates the corresponding project record.

In one example, the PCT server 322 first determines the project identifier of the synchronized project (e.g., by performing a lookup in the correspondence table G), and then extracts the relevant information from the update notification and updates one or more fields of the corresponding project record. For example, if the update notification includes a new issue name, the PCT server 322 may update the project name field with the new issue name. Similarly, if the estimated completion date of the issue is updated, the PCT server 322 updates the corresponding target date field with the new date. In some embodiments, the PCT server 322 may not delete the previous value of the field, but instead, may add an additional entry into the database for that field along with an update date/time and a source of the update (e.g., ITS). This way, when the next update for the project is generated, the PCT server 322 can display the update (e.g., the updated project name) along with an indication that the update is because the corresponding issue name was updated in the ITS.

Returning to step 1016, if the PCT server 322 does not identify any matching fields that are synchronized, it determines that the updated issue field(s) do not have any corresponding project fields that need to be updated and therefore determines that an update is not required. In this case, the PCT server 322 discards the update notification and method 1000 ends.

In method 1000, it is presumed that the ITS server 332 generates and communicates an update notification upon determining that the issue is synchronized with a project. In other embodiments, the ITS server 332 may not perform this check. Instead, it may be configured to communicate all issue update notifications to the PCT server 322. In such embodiments, the PCT server may determine if the updated issue is synchronized to a project or not at step 1010 (e.g., by checking the correspondence table G) and may discard the update notification in case it determines that the update notification is for an issue that is not synchronized with a project.

In other cases, the ITS server 332 may only generate and communicate an update notification upon determining that the issue is synchronized with a project and the updated issue field maps to a project field (that is synchronized with the updated issue field). In this case, the ITS server performs the method step 1018 before sending the issue update to the PCT server at step 1008 and only sends the issue update if it includes an updated issue field that maps to a project field.

Method 1000 is described in the context of updating a project record based on an update in an issue record. In an alternative context, an issue record may need to be updated based on an update in a project record. In such cases, the operations described with respect to flowchart 1000 above are generally reversed. In particular, the operations performed by the ITS server 332 in the flowchart are performed by the PCT server 322 and the operations performed by the PCT server 322 are performed by the ITS server 332. For example, and at a high level: the PCT server 322 detects an update in a project, determines whether the project is synchronized with an issue, and sends an update notification to the ITS server. The ITS server inspects the notification and performs an action based on the inspection. In particular, it may delete an issue-project synchronization record in table B if the project is deleted, it may update the issue record in case a project field that maps an issue field is updated, or discards the update notification.

FIG. 11 illustrates an example method 1100 for creating issue/goal association according to some aspects of the present disclosure. FIG. 11 is generally divided into operations performed by the ITS 330 (e.g., ITS client 314, ITS server 332, and the ITS data store 334) and operations performed by the PCT 320 (e.g., the PCT server 322, and the PCT data store 324).

At 1102, an issue that is to be linked with a goal is identified. Typically this identification will be achieved by user interaction with a UI provided on the client device 310 by ITS client 314 (in communication with ITS server 332). Such interaction may be by normal ITS mechanisms, e.g., searching or browsing for a particular issue via a navigation interface.

At 1104, the ITS client 314 receives (in response to operation of client device 310 by a user) an association request (which is also referred to as a link request in this disclosure when associating a goal to an issue) to associate the issue identified at 602 with a goal maintained by the PCT 320. In the present embodiment, a link request may be a request to associate the issue with an existing goal.

This request can be generated in multiple ways. In one example, a user may be viewing an issue view UI, e.g., interface 100 generated by ITS client 314 that displays information about the issue identified in step 1102. The issue view UI may further include a PCT goal element that is displayed by the auxiliary module 316.

Figure 13:
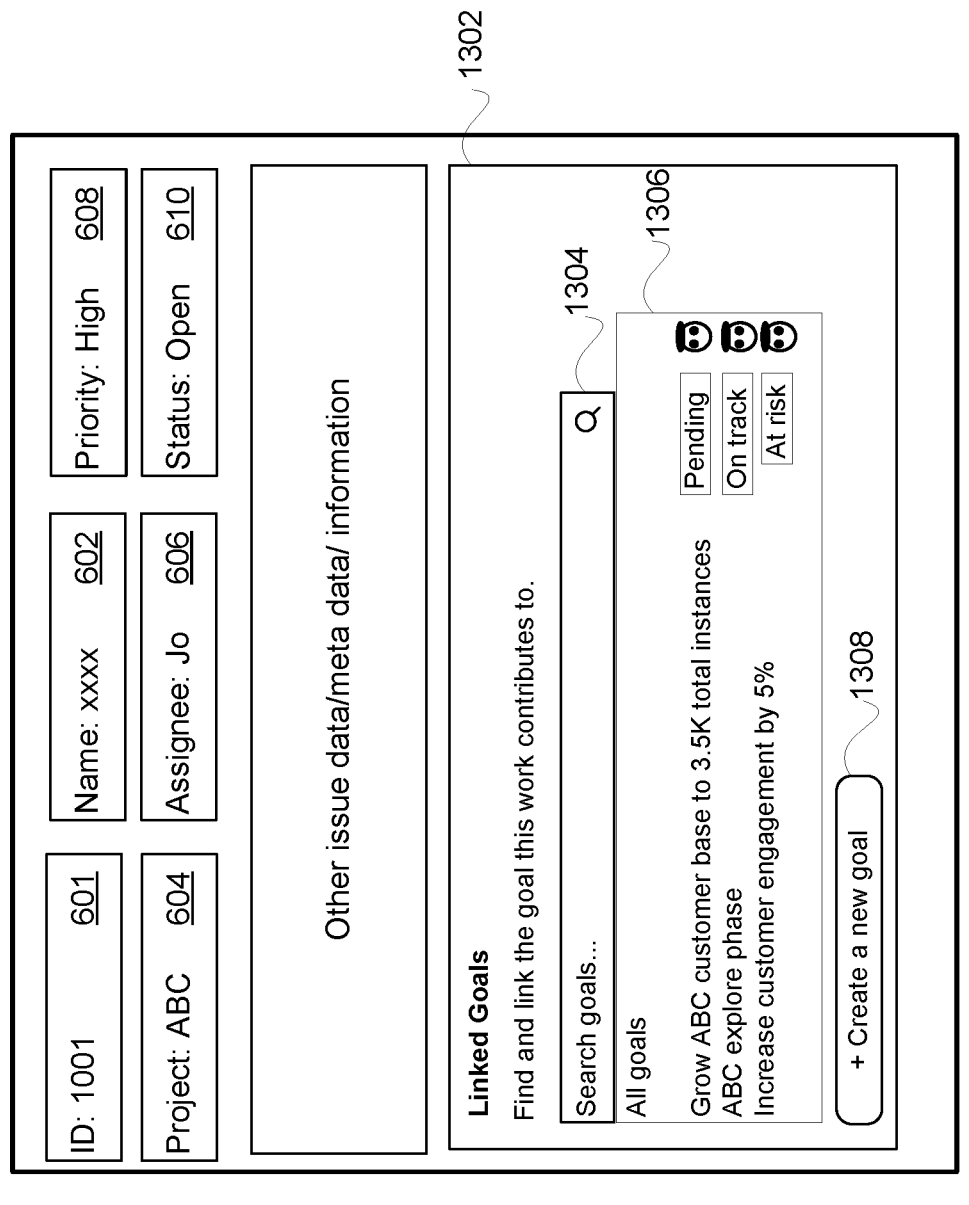
FIG. 13 is an example screenshot of an issue view user interface.

FIG. 13 illustrates one example of an issue view UI 1300 configured to facilitate linking of an issue with a goal. The UI 1300 is generated by the ITS client 314 (drawing information such as ITS issue data from ITS server 332) which causes the interface to be displayed by the client device 310 (e.g. on a display such as 412). UI 1300 generally includes ITS issue data (as described above with respect to FIG. 6).

The UI 1300 further includes an interactive element 1302 that is provided by the auxiliary module 316 (e.g., in communication with the PCT server 322). The PCT interactive element 1302 may include a picker search bar 1304 that allows users to search for a PCT goal they would like to link the current issue to. Selecting the search bar, may display a pop-up results interface 1306 that shows a list of all the goals maintained by the PCT server 322. As a user begins to type in the search bar 1304, the list of results in the pop-up results interface 1306 gets filtered to match the input. Each search result in the results interface 1306 may display goal summary information such as, but not limited to, goal name, goal status, and goal owner. The PCT interactive element 1302 further includes a user control 1308 for creating a new goal.

In this example, when a user performs a search for a goal via the search bar 1304 and selects a goal from a list of displayed search results (e.g., by contacting, clicking, hovering, keyboard shortcut, or alternative interaction with the search bar 1304) the auxiliary module 316 is configured to generate a link request to associate the issue identified at step 1102 with the selected goal. Alternative UIs are, of course, possible, displaying additional and/or alternative ITS issue data and/or controls.

At 1106, the auxiliary module 316 communicates the link request to the PCT server 322. In particular, it may communicate an issue identifier of the issue the user is currently viewing in the UI 1300 along with an identifier of the selected goal with the link request to the PCT server 322.

The PCT server 322 receives the request at step 1108 and links the goal with the corresponding issue. This involves, for example, updating its goal correspondence table (e.g., table H) by including a record of the issue identifier and corresponding goal identifier received with the link request in the goal correspondence table.

Once the PCT server 322 links the issue and goal (e.g., by updating the goal correspondence table H), the PCT server 322 may communicate a confirmation message to the auxiliary module 316 along with the summary data of the linked goal at step 1110. The communicated goal summary data may include for example, the name of the goal, the status of the project, the goal owner, the estimated completion date of the goal, etc.

The auxiliary module 316 upon receiving the confirmation and goal summary data, displays the goal summary data in the interactive element 1302 at step 1112.

Figure 14:
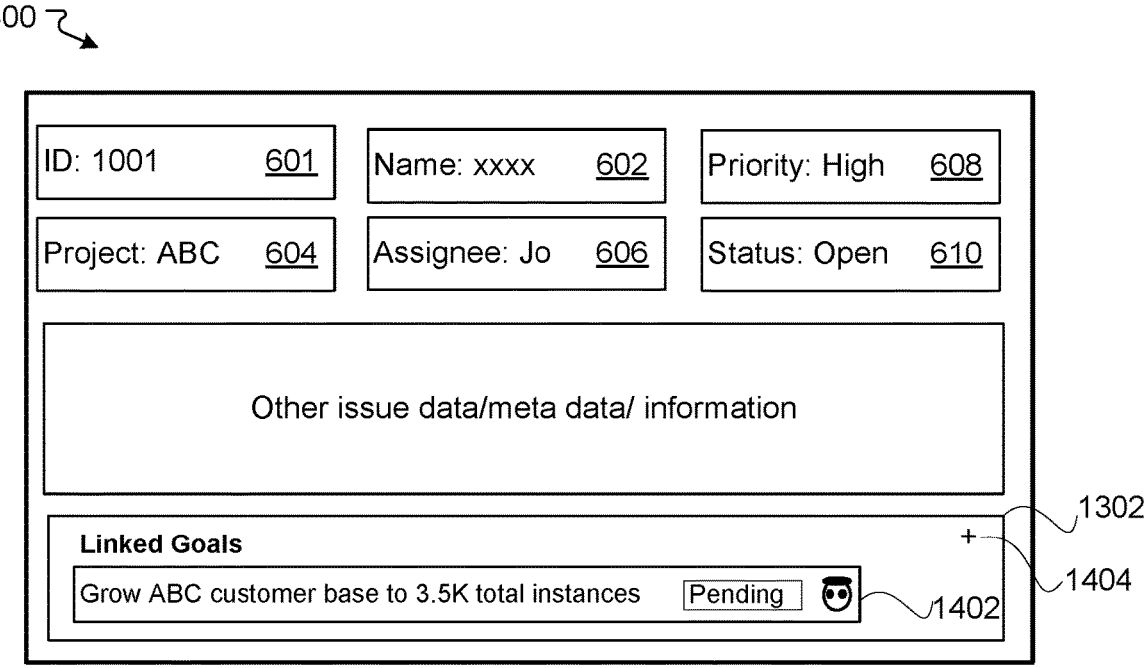
FIG. 14 is another example screenshot of an issue view user interface.

FIG. 14 illustrates an example issue view UI 1400 once an issue is linked with an existing goal. The UI 1400 is generated by ITS client 314 (drawing information such as ITS issue data from ITS server 332) and the auxiliary module 316 (drawing information such as goal data from the PCT server 322) which causes the interface to be displayed by the client device 310 (e.g. on a display such as 412). Like, UI 1300, UI 1400 generally includes ITS issue data (of the issue being viewed). The UI 1400 further includes the interactive element 1302 that is provided by the auxiliary module 316 (e.g., in communication with the PCT server 322). The PCT interactive element 1302 now includes information about the linked goal 1402, including e.g., the goal name, the goal status, and the goal owner. The PCT interactive element 1302 further includes a user control 1404 to link further goals to the issue.

Method 1100 ends once UI 1400 is displayed.

In some embodiments, a goal may not exist in the PCT 320 that a user can link an issue to. However, the user may wish to create a goal in the PCT 320 and then link an issue to that goal. In order to do so, the auxiliary module 316 allows a user to create a PCT goal directly from the ITS client 314 and then also link the newly created goal with the issue.

FIG. 12 illustrates an example method 1200 for doing so. In particular, FIG. 12 illustrates an example method for creating a new goal using an ITS client 314 and then linking that new goal with an ITS issue. FIG. 12 is generally divided into operations performed by the ITS 330 (e.g., the ITS client 314 with the auxiliary module 316, the ITS server 332 and the ITS data store 334) and operations performed by the PCT 320 (e.g., the PCT server 322, and the PCT data store 324).

Method 1200 commences at step 1202, where an issue that is to be linked with a goal is identified. This step is similar to step 1102 and therefore is not described again.

At 1204, the auxiliary module 316 receives (in response to operation of client device 310 by a user) a request to create a new goal and link the new goal with the issue identified at step 1202. This request can be generated in multiple ways. In one example, a user may be viewing an issue view UI 1300 and may select the user control 1308 for creating a new goal in PCT 320.

Upon receiving the request, the auxiliary module 316 may display a user input form to receive information about the goal the user wishes to create. In one example, the auxiliary module 316 may display a pop-up user input form. In another embodiment, the auxiliary module replaces the interactive element 1302 with a user input form.

Figure 15:
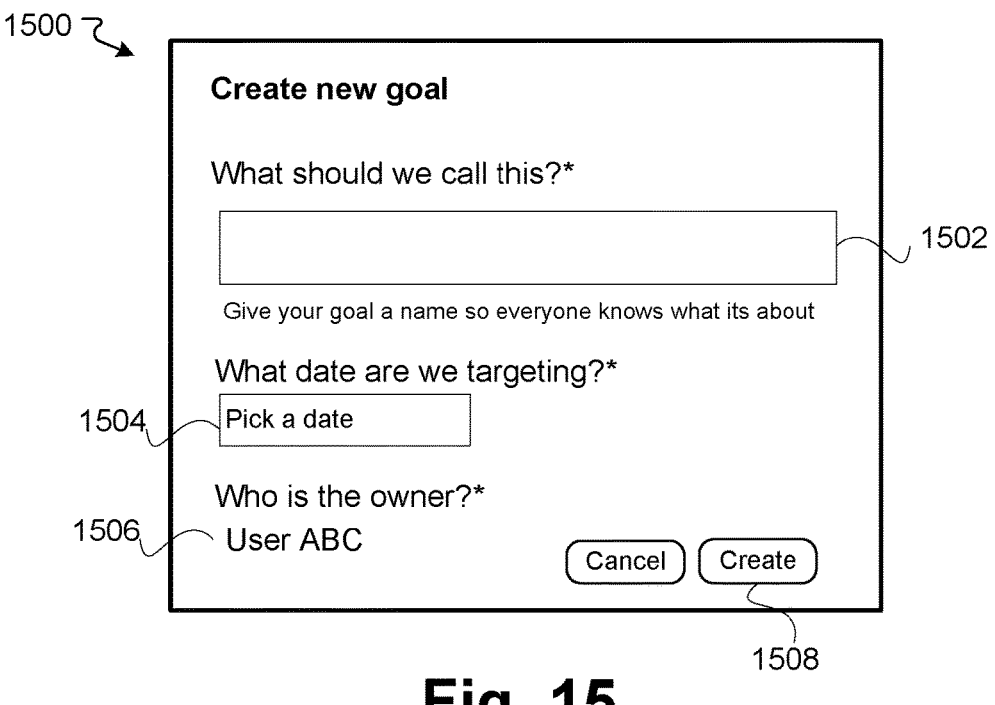
FIG. 15 is an example user input form for creating a goal.

FIG. 15 illustrates an example user input form 1500. The user input form 1500 includes one or more fields that can be filled in by the user. These fields may include, e.g., a goal name field 1502 to receive a name for the newly created goal, a target date field 1504 to receive a date by which the user estimates the goal will be reached, and a name field

1506 of an owner for the goal (this field may be automatically filled in using the name of the user logged in the ITS 330.

At step 1206, once the user is satisfied with the goal details in the input form 1500, the user selects the 'create' user control 1508. Selection of the user control 1508 causes the auxiliary module 316 to generate a goal creation request and communicate the goal creation request to the PCT server 322.

The goal creation request includes the information input by the user in the input form 1500, information about the corresponding issue, and an identifier of the user making the request. The auxiliary module 316 may obtain the information about the issue and the user by querying the ITS server 332. The information about the corresponding issue includes, e.g., the issue identifier and the issue name.

Upon receiving the goal creation request, at step 1208, the PCT server 322 creates a new goal. This may include creating a new goal record in the data store 324. In particular, the PCT server 322 creates a new record in the goal data table (e.g., table F) with a new goal identifier and records the following goal information—goal name, target date, and project owner.

Once the PCT server 322 updates the project data table it also links the newly created goal with the corresponding issue at step 1210. This involves, for example, updating the issue correspondence table (e.g., table I) by adding a record to the table that includes the newly created goal identifier and the issue identifier.

At step 1212, the PCT server 322 communicates the goal summary data of the newly created and linked goal to the auxiliary module 316. The auxiliary module 316 then displays the goal data in the issue view UI 1400 at step 1214. These steps (1212-1214) are similar to steps 1110 and 1112 of FIG. 11 and therefore are not described here again in detail.

The method 1200 then ends. Thereafter, whenever the user views the issue in an issue view UI, the summary information of the linked goal is displayed in the PCT interactive element 1302 as shown in example UI 1400.

The operations described above with respect to methods 1100 and 1200 are in respect of associating an issue with a goal. In certain embodiments, the ITS 330 and PCT 320 may be configured to allow a single issue to be associated with multiple goals and/or a single goal to be associated with multiple issues. This can be useful, for example, where a single issue contributes to multiple goals or multiple issues contribute to a single goal.

Operations 1100 and 1200 described above are in the context of a user associating an issue with a goal by initial interaction with the ITS. In an alternative context, a user may associate an issue with a goal by initial interaction with the PCT. Where the user is initially interacting with the PCT, the operations described with respect to flowchart 1100 and 1200 above are (in a very general sense) reversed. For example, and at a high level: the user is initially interacting with a PCT goal UI (provided by the PCT client 312); an auxiliary module provided by the ITS provides a search interface to search for one or more issues to link to the displayed goal. A user may identify an issue to link to the goal via the search interface and activates an issue association control, which causes the auxiliary module to communicate a link request to the PCT server and an issue data request for the selected issue to the ITS server. The PCT server then records the link (by updating the goal correspondence table I), and the ITS server communicates the requested issue data to the auxiliary module on the PCT client 312. The auxiliary module 316 then displays issue data in an interactive element on the PCT UI.

In the foregoing specification, embodiments have been described with reference to numerous specific details that may vary from implementation to implementation. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for associating a first object maintained by a first computer application with a second object maintained by a second computer application, the first and second computer applications being independent computer applications, the computer-implemented method comprising:

installing an auxiliary module provided by the first computer application in a second client associated with the second computer application;

displaying, by the auxiliary module, an interactive element in a user interface generated by the second client, the user interface displaying the second object, the interactive element including a control to associate the second object with the first object;

in response to detecting a selection of the control, generating by the auxiliary module, an association request, the association request including a first identifier of the first object and a second identifier of the second object;

communicating, by the auxiliary module, the association request to the first computer application to cause the first computer application to create a correspondence record in a correspondence table, the correspondence record associating the first object with the second object and including the first and second identifiers;

receiving, by the auxiliary module, object data associated with the first object from the first computer application; and displaying the object data associated with the first object in the interactive element.

2. The computer-implemented method of claim 1, wherein the first object is a project maintained by a project communication tool and the second object is an issue maintained by an issue tracking system.

3. The computer-implemented method of claim 1, further comprising:

communicating, by the first computer application, the association request to the second computer application to cause the second computer application to create a second correspondence record in a second correspondence table, the correspondence record associating the first object with the second object and including the first and second identifiers.

4. The computer-implemented method of claim 1, wherein the first object is a goal maintained by a project communication tool and the second object is an issue maintained by an issue tracking system.

5. The computer-implemented method of claim 1, wherein displaying the interactive element comprises displaying one or more picker search bar for performing a search for the first object or a list comprising a plurality of objects maintained by the first computer application including the first object.

6. The computer-implemented method of claim 5, wherein the selection of the control includes performing a search for the first object in the one or more picker search bar or selecting the first object from the list of the plurality of objects before selecting the control to associate the second object with the first object.

7. The computer-implemented method of claim 1, wherein associating the first object with the second object includes synchronizing values of one or more data fields associated with the first object with values of one or more data fields associated with the second object.

8. The computer-implemented method of claim 1, wherein associating the first object with the second object includes synchronizing values of one or more data fields associated with the first object that are selected by a user with values of one or more data fields associated with the second object.

9. The computer-implemented method of claim 7, further comprising:

receiving, by the first computer application, an update notification, the update notification indicating an update in one or more data fields associated with the second object;

determining, by the first computer application, if data associated with the first object includes the one or more data fields that are synchronized with the one or more updated data fields associated with the second object; and upon determining that the first object includes one or more data fields that are synchronized with the one or more updated data fields associated with the second object, updating the one or more data fields of the first object that are synchronized with the one or more updated data fields associated with the second object.

10. The computer-implemented method of claim 9, further comprising:

inspecting, by the first computer application, the update notification to determine an update notification type; and upon determining that the update notification type is a deletion type of notification, deleting, by the first computer application, the correspondence record in the correspondence table.

11. A computer-implemented method for creating a first object to be maintained by a first computer application using a client of a second computer application, the first and second computer applications being independent computer applications, the computer-implemented method comprising:

installing an auxiliary module provided by the first computer application in the client associated with the second computer application;

displaying, by the auxiliary module, an interactive element in a user interface generated by the client associated with the second computer application, the interactive element including a control to create the first object;

in response to detecting selection of the control, generating by the auxiliary module, a creation request, the creation request including at least a name of the first object;

communicating, by the auxiliary module, the creation request to the first computer application to cause the first computer application to create the first object;

receiving, by the auxiliary module, object data associated with the first object from the first computer application; and displaying the object data associated with the first object in the interactive element.

12. The computer-implemented method of claim 11, wherein the creation request further including an identifier of a second object maintained by the second computer application.

13. The computer-implemented method of claim 12, further comprising:

associating, by the first computer application, the second object with the first object, wherein the associating includes creating a correspondence record in a correspondence table, the correspondence record associating the first object with the second object.

14. The computer-implemented method of claim 13, further comprising:

communicating, by the first computer application, an association request to the second computer application to cause the second computer application to create a second correspondence record in a second correspondence table, the correspondence record associating the first object with the second object.

15. The computer-implemented method of claim 12, wherein the first object is a project maintained by a project communication tool and the second object is an issue maintained by an issue tracking system.

16. The computer-implemented method of claim 12, wherein the first object is a goal maintained by a project communication tool and the second object is an issue maintained by an issue tracking system.

17. The computer-implemented method of claim 13, wherein associating the second object with the first object includes synchronizing values of one or more data fields associated with the second object with values of one or more data fields associated with the first object.

18. The computer-implemented method of claim 13, wherein associating the second object with the first object includes synchronizing values of one or more data fields associated with the second object that are selected by a user with values of one or more data fields associated with the first object.

19. The computer-implemented method of claim 17, further comprising:

receiving, by the first computer application, an update notification, the update notification indicating an update in one or more data fields associated with the second object;

determining, by the first computer application, if data associated with the first object includes the one or more data fields that are synchronized with the one or more updated data fields associated with the second object; and upon determining that the first object includes one or more data fields that are synchronized with the one or more updated data fields associated with the second object, updating the one or more fields of the first object that are synchronized with the one or more updated data fields associated with the second object.

20. The computer-implemented method of claim 19, further comprising:

inspecting, by the first computer application, the update notification to determine an update notification type; and upon determining that the update notification type is a deletion type of notification, deleting, by the first computer application, the correspondence record in the correspondence table.

* * * * *